United States Patent
Iwamoto et al.

(10) Patent No.: US 9,613,287 B2
(45) Date of Patent: *Apr. 4, 2017

(54) LOCAL FEATURE DESCRIPTOR EXTRACTING APPARATUS, METHOD FOR EXTRACTING LOCAL FEATURE DESCRIPTOR, AND PROGRAM

(71) Applicant: NEC Corporation, Tokyo (JP)

(72) Inventors: Kota Iwamoto, Tokyo (JP); Ryota Mase, Tokyo (JP)

(73) Assignee: NEC Corporation, Tokyo (JP)

( * ) Notice: Subject to any disclaimer, the term of this patent is extended or adjusted under 35 U.S.C. 154(b) by 72 days.

This patent is subject to a terminal disclaimer.

(21) Appl. No.: 14/359,049

(22) PCT Filed: Nov. 15, 2012

(86) PCT No.: PCT/JP2012/079671
§ 371 (c)(1),
(2) Date: May 16, 2014

(87) PCT Pub. No.: WO2013/073621
PCT Pub. Date: May 23, 2013

(65) Prior Publication Data
US 2014/0321755 A1    Oct. 30, 2014

(30) Foreign Application Priority Data
Nov. 18, 2011    (JP) ................................ 2011-253257

(51) Int. Cl.
*G06K 9/00*    (2006.01)
*G06K 9/46*    (2006.01)
(Continued)

(52) U.S. Cl.
CPC ......... *G06K 9/4604* (2013.01); *G06K 9/4642* (2013.01); *G06K 9/4671* (2013.01); *G06K 9/481* (2013.01); *G06K 9/6247* (2013.01)

(58) Field of Classification Search
CPC .. G06K 9/4604; G06K 9/4642; G06K 9/6247; G06K 9/481; G06K 9/4671
See application file for complete search history.

(56) References Cited

U.S. PATENT DOCUMENTS 6,711,293 B1    3/2004 Lowe
2010/0080419 A1   4/2010 Okugi et al.
(Continued)

FOREIGN PATENT DOCUMENTS

CN    101980250 A    2/2011
CN    102004916 A    4/2011
(Continued)

OTHER PUBLICATIONS

Kozakaya, Tatsuo. "Facial Feature Localization Using Weighted Vector Concentration Approach." Image and Vision Computing 28, No. 5 (May 5, 2010): 772-80. Accessed Dec. 28, 2015. http://www.sciencedirect.com/science/article/pii/S0262885609001954.*

(Continued)

*Primary Examiner* — John Strege
(74) *Attorney, Agent, or Firm* — Wilmer Cutler Pickering Hale and Dorr LLP

(57) ABSTRACT

The size of a feature descriptor is reduced with the accuracy of object identification maintained. A local feature descriptor extracting apparatus includes a feature point detecting unit configured to detect feature points in an image, a local region acquiring unit configured to acquire a local region for each of the feature points, a subregion dividing unit configured to divide each local region into a plurality of subregions, a subregion feature vector generating unit configured to generate a feature vector with a plurality of dimensions for each of the subregions in each local region, and a dimension selecting unit configured to select dimensions from the feature vector in each subregion so as to reduce a correlation between the feature vectors in proximate subre- (Continued)

gions based on positional relations among the subregions in each local region and output elements of the selected dimensions as a feature descriptor of the local region.

16 Claims, 28 Drawing Sheets

(51) Int. Cl.
*G06K 9/48* (2006.01)
*G06K 9/62* (2006.01)

(56) References Cited

U.S. PATENT DOCUMENTS

| | | | |
|---|---|---|---|
| 2010/0124377 | A1 | 5/2010 | Yu et al. |
| 2010/0246969 | A1 | 9/2010 | Winder et al. |
| 2011/0299782 | A1 | 12/2011 | Hamsici et al. |

FOREIGN PATENT DOCUMENTS

| | | |
|---|---|---|
| CN | 102169581 A | 8/2011 |
| WO | WO-2011/069023 A2 | 6/2011 |

OTHER PUBLICATIONS

International Search Report corresponding to PCT/JP2012/079671, dated Jan. 22, 2013; 2 pages.
Lowe, D., "Distinctive Image Features from Scale-Invariant Keypoints", (U.S.), International Journal of Computer Vision, 60(2), 2004, pp. 91-110.
Fujiyoshi, H., "Gradient-Based Feature Extraction: SIFT and HOG", IPSJ SIG Notes, Sep. 3, 2007, vol. 2007, No. 87, pp. 211-224.
Kobayashi, T., "Higher-Order Local Autocorrelation Based Image Features and Their Applications", The Journal of the Institute of Electronics, Information and Communication Engineers, Apr. 1, 2011, vol. 94, No. 4; pp. 335-340.
Hondo, T., "Inspection of Memory Reduction Methods for Specific Object Recognition", IPSJ SIG Notes, Mar. 6, 2009, vol. 2009, No. 29; pp. 171-176.
Kise, K., "Specific Object Recognition by Image Matching Using Local Features", Journal of Japanese Society for Artificial Intelligence, Nov. 1, 2010, vol. 25, bi, 6; pp. 769-776.
Chinese Office Action issued by The State Intellectual Property Office of the People's republic of China for Application No. 201280056878.6 dated Feb. 2, 2016 (8 pages).
Wang, Jing, "Research on a method of automatic image matching based on SIFT and corner detection," China Dissertation Database, pp. 23-25, 8 pages (Sep. 20, 2011).
Japanese Notification of First Office Action issued in corresponding Japanese Application No. 201280056878.6, dated Feb. 2, 2016, 8 pages.
Extended European Search Report corresponding to European Application No. 12848829.3, dated Feb. 17, 2016, 10 pages.
Jianchao Yang, et al. "Linear Spatial Pyramid Matching Using Sparse Coding for Image Classification", 2009 IEEE Conference on Computer Vision and Pattern Recognition: CVPR 2009; Miami [Beach], Florida, USA, Jun. 20-25, 2009, SP0361607284, pp. 1794-1801.
Karl Soule "The Video Road—Color Subsampling, or What is 4:4:4 or 4:2:2??", XP055247607, Jun. 28, 2010, http://blogs.adobe.com/VideoRoad/2010/06/color_subsampling_or_what_is_4.html [retrieved on Feb. 4, 2016], 4 pages.
Vijay Chandrasekhar, et al. "Survey of SIFT Compression Schemes", Internet Citation, Dec. 31, 2010, XP002719362, http://www.standford.edu/ mamakar/pub_files/VijayICPR-WMMP2010.pdf [retrieved on Jan. 28, 2014], pp. 1-8.
Vijay Chandrasekhar, et al. "Transform Coding of Image Feature Descriptors", Visual Communications and Image Processing, 20 Jan. 2009; San Jose, XP030081744, 9 pages.

\* cited by examiner

| 22 | 14 | 10 | 18 | 23 |
|----|----|----|----|----|
| 21 | 6  | 2  | 7  | 15 |
| 13 | 5  | 1  | 3  | 11 |
| 17 | 9  | 4  | 8  | 19 |
| 25 | 20 | 12 | 16 | 24 |

| 10 | 18 | 6  | 22 | 11 |
|----|----|----|----|----|
| 25 | 2  | 14 | 3  | 19 |
| 9  | 17 | 1  | 15 | 7  |
| 21 | 5  | 16 | 4  | 23 |
| 13 | 24 | 8  | 20 | 12 |

FIG. 8A

| 22 | 5  | 18 | 9  | 23 |
|----|----|----|----|----|
| 12 | 14 | 1  | 15 | 6  |
| 21 | 4  | 13 | 2  | 19 |
| 8  | 17 | 3  | 16 | 10 |
| 25 | 11 | 20 | 7  | 24 |

FIG. 8B

|    |    |   |    |
|----|----|---|----|
| 13 | 5  | 9 | 14 |
| 12 | 1  | 3 | 6  |
| 8  | 4  | 2 | 10 |
| 16 | 11 | 7 | 15 |

FIG. 21

16 DIMENSIONS

| | | | | | | | | | | | | | | | | |
|---|---|---|---|---|---|---|---|---|---|---|---|---|---|---|---|---|
| 16 | 30 | 64 | 39 | 55 | 7 | 44 | 87 | 52 | 16 | 67 | 80 | 29 | 2 | 23 | 90 | 77 |
| 32 | 34 | 62 | 37 | 59 | 11 | 42 | 85 | 50 | 14 | 71 | 78 | 27 | 0 | 21 | 94 | 75 |
| 48 | 32 | 60 | 41 | 57 | 9 | 46 | 89 | 48 | 12 | 69 | 82 | 25 | 4 | 19 | 92 | 73 |
| 64 | 35 | 63 | 40 | 54 | 6 | 43 | 88 | 51 | 15 | 66 | 79 | 26 | 1 | 20 | 95 | 74 |
| 80 | 33 | 61 | 36 | 56 | 8 | 47 | 84 | 49 | 13 | 68 | 83 | 28 | 5 | 22 | 93 | 76 |
| 96 | 31 | 65 | 38 | 58 | 10 | 45 | 86 | 53 | 17 | 70 | 81 | 24 | 3 | 18 | 91 | 72 |

FIG. 22

LOCAL FEATURE DESCRIPTOR EXTRACTING APPARATUS, METHOD FOR EXTRACTING LOCAL FEATURE DESCRIPTOR, AND PROGRAM

CROSS-REFERENCE TO RELATED APPLICATIONS

This application is a national stage application of International Application No. PCT/JP2012/079671 entitled "Local Feature Amount Extraction Device, Local Feature Amount Extraction Method, And Program," filed on Nov. 15, 2012, which claims the benefit of the priority of Japanese Patent Application No. 2011-253257, filed on Nov. 18, 2011, the disclosures of each of which are hereby incorporated by reference in their entirety.

BACKGROUND

The present invention relates to a local feature descriptor extracting apparatus, a method for extracting a local feature descriptor, and a program.

Schemes have been proposed which are intended to robustly identify an object in an image in the presence of a change in photographing size or angle or occlusion. The schemes involve detecting a large number of interest points (feature points) in an image and extracting a feature descriptor in a local region (local feature descriptor) around each of the feature points. As a typical scheme, Patent Literature 1 and Non Patent Literature 1 disclose local feature descriptor extracting apparatuses that use SIFT (Scale Invariant Feature Transform) feature descriptors.

FIG. 31 is a diagram showing an example of a general configuration of a local feature descriptor extracting apparatus that uses SIFT feature descriptors. Furthermore, FIG. 32 is a diagram showing an image of extraction of SIFT feature descriptors in the local feature descriptor extracting apparatus shown in FIG. 31.

As shown in FIG. 31, the local feature descriptor extracting apparatus includes a feature point detecting unit 200, a local region acquiring unit 210, a subregion dividing unit 220, and a subregion feature vector generating unit 230. The feature point detecting unit 200 detects a large number of interest points (feature points) in an image and outputs the coordinate position, scale (size), and orientation of each of the feature points. The local region acquiring unit 210 acquires a local region from which the feature descriptor is to be extracted based on the coordinate value, scale, and orientation of each of the detected feature points. The subregion dividing unit 220 divides the local region into subregions. In an example illustrated in FIG. 32, the subregion dividing unit 220 divides the local region into 16 blocks (4×4 blocks). The subregion feature vector generating unit 230 generates a gradient orientation histogram for each of the subregions of the local region. Specifically, the subregion feature vector generating unit 230 calculates a gradient orientation for each of pixels in each subregion and carries out quantization to obtain eight orientations. The determined orientation directions are directions relative to the orientations of the feature points output by the feature point detecting unit 200. That is, the orientation directions are directions normalized with respect to the orientations output by the feature point detecting unit 200. Then, the subregion feature vector generating unit 230 aggregates the frequencies of the quantized eight orientations for each subregion to generate a gradient orientation histogram. Thus, the gradient orientation histogram of 16 blocks×eight orientations generated for each feature point is output as a 128-dimensional local feature descriptor.

Patent Literature 1: U.S. Pat. No. 6,711,293

Non Patent Literature 1: David G. Lowe, "Distinctive image features from scale-invariant keypoints", (U.S.), International Journal of Computer Vision, 60(2), 2004, p. 91-110

The above-described local feature descriptor disadvantageously has an increased size. For example, in order to express a histogram value in each dimension in 1 byte, the SIFT feature descriptor needs a size of 128 dimensions×1 byte. The thus increased size of the local feature descriptor may pose a problem when local feature descriptors are used to match images against each other (matching). For example, when a user terminal (for example, a portable terminal with a camera) extracts a local feature descriptor from an image and transmits the local feature descriptor to a server in order to search for an image similar to the image from which the local feature descriptor has been extracted, a large size of the local feature descriptor increases a communication time. This increases the amount of time until the result of an image search is obtained. Furthermore, a large size of the local feature descriptor increases a processing time when images are matched against each other based on local feature descriptors. In addition, in the image search using local feature descriptors, the local feature descriptors in the image are stored in a memory. However, a large size of the local feature descriptor reduces the number of images for which the local feature descriptors may be stored on the memory. Hence, the use of local feature descriptors is not suitable for large-scale image searches intended for a large number of images.

SUMMARY

Thus, an object of the present invention is to reduce the size of the feature descriptor with the accuracy of object identification maintained.

A local feature descriptor extracting apparatus according to an aspect of the present invention includes a feature point detecting unit detecting feature points in an image, a local region acquiring unit acquiring a local region for each of the feature points, a subregion dividing unit dividing each local region into a plurality of subregions, a subregion feature vector generating unit generating a feature vector with a plurality of dimensions for each of the subregions in each local region, and a dimension selecting unit selecting dimensions from the feature vector in each subregion so as to reduce a correlation between the feature vectors in proximate subregions based on positional relations among the subregions in each local region and outputting elements of the selected dimensions as a feature descriptor of the local region.

Furthermore, in a method for extracting a local feature descriptor according to an aspect of the present invention, a computer detects feature points in an image, acquires a local region for each of the feature points, divides each local region into a plurality of subregions, generates a feature vector with a plurality of dimensions for each of the subregions in each local region, and selects dimensions from the feature vector in each subregion so as to reduce a correlation between the feature vectors in proximate subregions based on positional relations among the subregions in each local region and outputs elements of the selected dimensions as a feature descriptor of the local region.

Additionally, a program according to an aspect of the present invention allows a computer to implement a function to detect feature points in an image, a function to acquire a local region for each of the feature points, a function to divide each local region into a plurality of subregions, a function to generate a feature vector with a plurality of dimensions for each of the subregions in each local region, and a function to select dimensions from the feature vector in each subregion so as to reduce a correlation between the feature vectors in proximate subregions based on positional relations among the subregions in each local region and output elements of the selected dimensions as a feature descriptor of the local region.

According to the present invention, the "unit" does not simply mean physical means but includes implementation of functions of the "unit" by software. Furthermore, the functions of one "unit" or apparatus may be implemented by two or more physical means or apparatuses or the functions of two or more "units" or apparatuses may be implemented by one physical means or apparatus.

The present invention may reduce the size of feature descriptors with the accuracy of object identification maintained.

DESCRIPTION OF DRAWINGS

FIG. 4 is a diagram showing an example of priorities for selection of dimensions.

FIG. 7 is a diagram showing an example of a configuration of a local feature descriptor output in accordance with the priorities.

FIGS. 8A and 8B are diagrams showing an example of priorities for selection of dimensions.

FIG. 21 is a diagram showing another example of priorities for selection of dimensions.

FIG. 22 is a diagram showing a configuration example of a local feature descriptor output in accordance with the priorities.

DETAILED DESCRIPTION

Embodiments of the present invention will be described below with reference to the drawings.

First Embodiment

Figure 1:
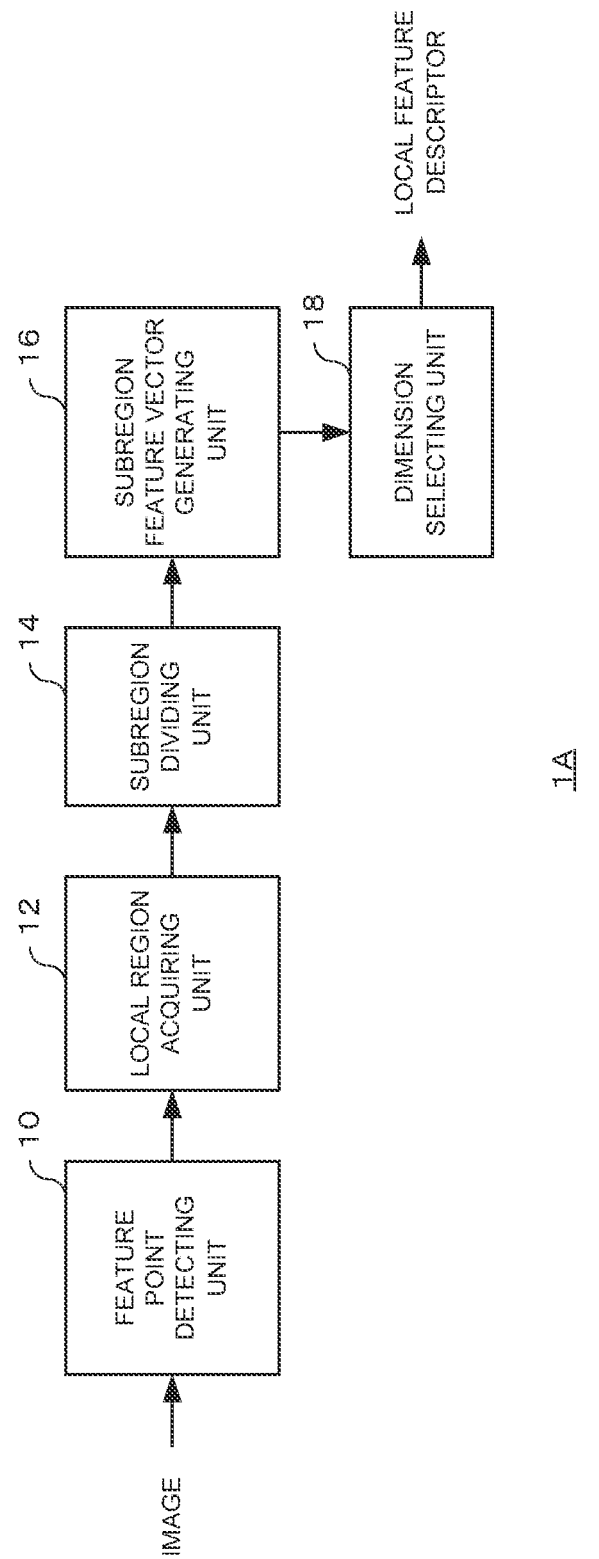
FIG. 1 is a diagram showing a configuration of a local feature descriptor extracting apparatus that is a first embodiment of the present invention.

FIG. 1 is a diagram showing a configuration of a local feature descriptor extracting apparatus that is a first embodiment of the present invention. A local feature descriptor extracting apparatus 1A is configured to include a feature point detecting unit 10, a local region acquiring unit 12, a subregion dividing unit 14, a subregion feature vector generating unit 16, and a dimension selecting unit 18. The local feature descriptor extracting apparatus 1A may be configured, for example, using an information processing apparatus such as a personal computer or a personal digital assistance. Units of the local feature descriptor extracting apparatus 1A may be implemented by, for example, using storage areas such as memories or by a processor executing programs stored in the storage areas. Components in other embodiments described below may be similarly implemented.

The feature point detecting unit 10 detects a large number of interest points (feature points) in an image, and outputs the coordinate position, scale (size), and orientation of each of the feature points.

The local region acquiring unit 12 acquires a local region from which feature descriptors are to be extracted based on the coordinate value, scale, and orientation of each of the detected feature points.

Figure 32:
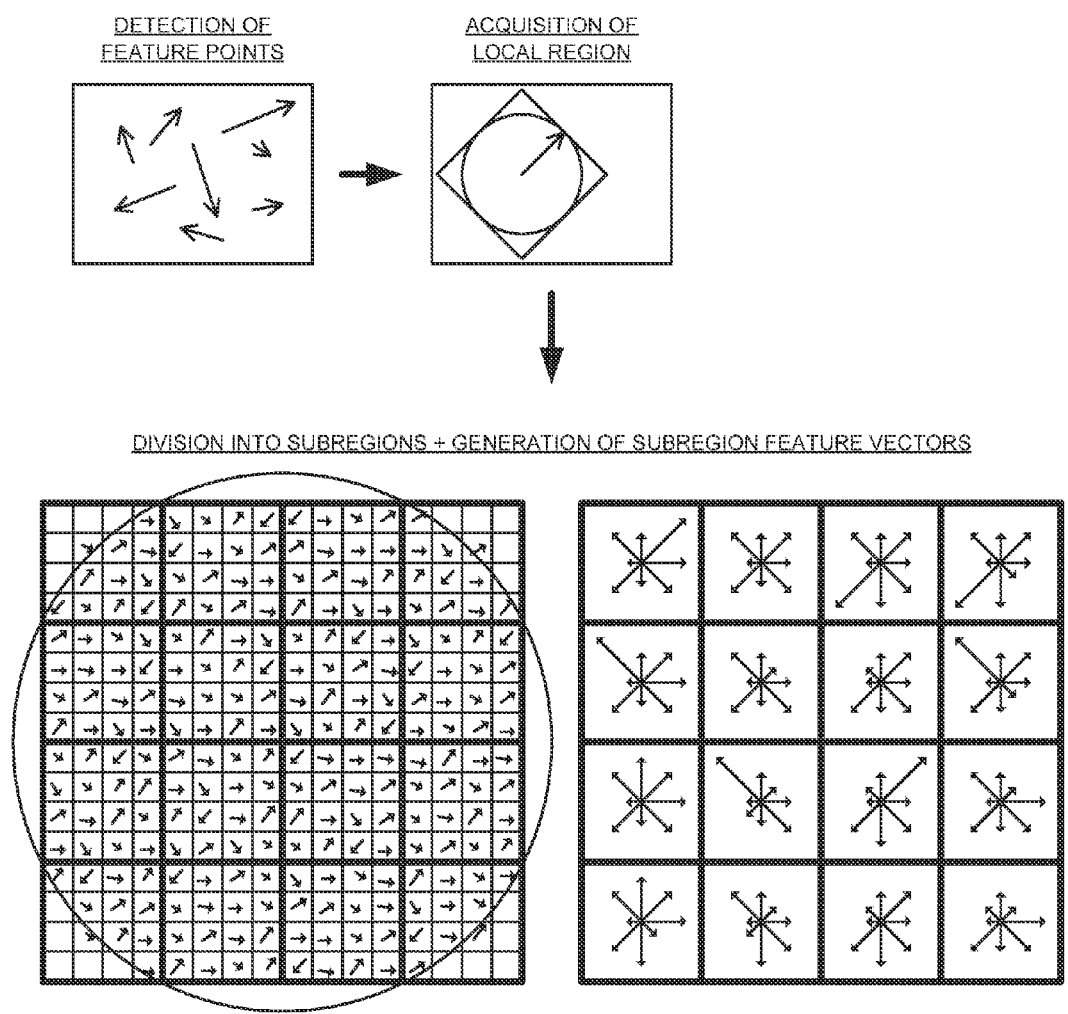
FIG. 32 is a diagram showing an image of extraction of an SIFT local feature descriptor in the local feature descriptor extracting apparatus.

The subregion dividing unit 14 divides the local region into subregions. For example, the subregion dividing unit 14 may divide the local region into 16 blocks (4×4 blocks) as shown in FIG. 32. Alternatively, the subregion dividing unit 14 may divide the local region into 25 blocks (5×5 blocks).

The subregion feature vector generating unit 16 generates a feature vector for each of the subregions in the local region. As feature vectors in the subregions, for example, a gradient orientation histogram may be used. Specifically, the subregion feature vector generating unit 16 calculates a gradient orientation for each of pixels in each subregion, and carries out quantization to obtain eight orientations. The determined orientation directions are directions relative to the orientations of the feature points output by the feature point detecting unit 10. That is, the orientation directions are directions normalized with respect to the orientations output by the feature point detecting unit 10. Then, the subregion feature vector generating unit 16 aggregates the frequencies of the quantized eight orientations for each subregion to generate a gradient orientation histogram. In this case, the subregion feature vector generating unit 16 outputs feature vectors including gradient orientation histograms of 16 blocks×8 orientations=128 dimensions generated for each feature point. Furthermore, the number of gradient orientations resulting from the quantization is not limited to eight but may be any quantization number such as four, six, or ten. When D gradient orientations are to be obtained by the quantization, if a gradient orientation before the quantization is denoted by G (0 to $2\pi$ radian), a quantization value (i) (i=0, . . . , D−1) for the gradient orientations may be determined using, for example, Formula (1) or Formula (2). However, the first embodiment is not limited to these formulae.

[Formula 1]
$$i = \text{floor}\left(G \times \frac{D}{2\pi}\right) \quad (1)$$

[Formula 2]
$$i = \text{round}\left(G \times \frac{D}{2\pi}\right) \bmod D \quad (2)$$

In this case, floor( ) denotes a function to truncate digits after the decimal point, round( ) denotes a function for round-off, and mod denotes a calculation for determining the remainder. Furthermore, when a gradient orientation histogram is generated, it is possible to add the magnitudes of gradients together for aggregation instead of aggregating simple frequencies. Additionally, when aggregation is carried out for the gradient orientation histogram, a weight value may not only be added to subregions to which pixels belong but also be added to proximate subregions (adjacent blocks or the like) based on distances between the subregions. In addition, a weight value may be added to gradient orientations preceding and following a quantized gradient orientation. The feature vectors in the subregions are not limited to the gradient orientation histogram but may be color information or the like, which has a plurality of dimensions (elements). In the description of the first embodiment, the gradient orientation histogram is used as the feature vectors in the subregions.

The dimension selecting unit 18 selects (culls) dimensions (elements) to be output as a local feature descriptor so as to reduce the correlation between the feature vectors in proximate subregions. More specifically, the dimension selecting unit 18 selects dimensions such that adjacent subregions are different from each other in at least one gradient orientation. According to the first embodiment, an adjacent subregion is mainly used as a proximate subregion. However, the proximate subregion is not limited to the adjacent subregion but may be, for example, a subregion at a predetermined distance or shorter from a target subregion.

Furthermore, the dimension selecting unit 18 may not only simply select dimensions but also determine priorities for selection. That is, the dimension selecting unit 18 may provide priorities for selection of dimensions so that dimensions selected from adjacent subregions are not in the same gradient orientation. The dimension selecting unit 18 then outputs feature vectors including the selected dimensions as a local feature descriptor. The dimension selecting unit 18 may output the local feature descriptor with the dimensions rearranged based on the priorities.

Figure 2:
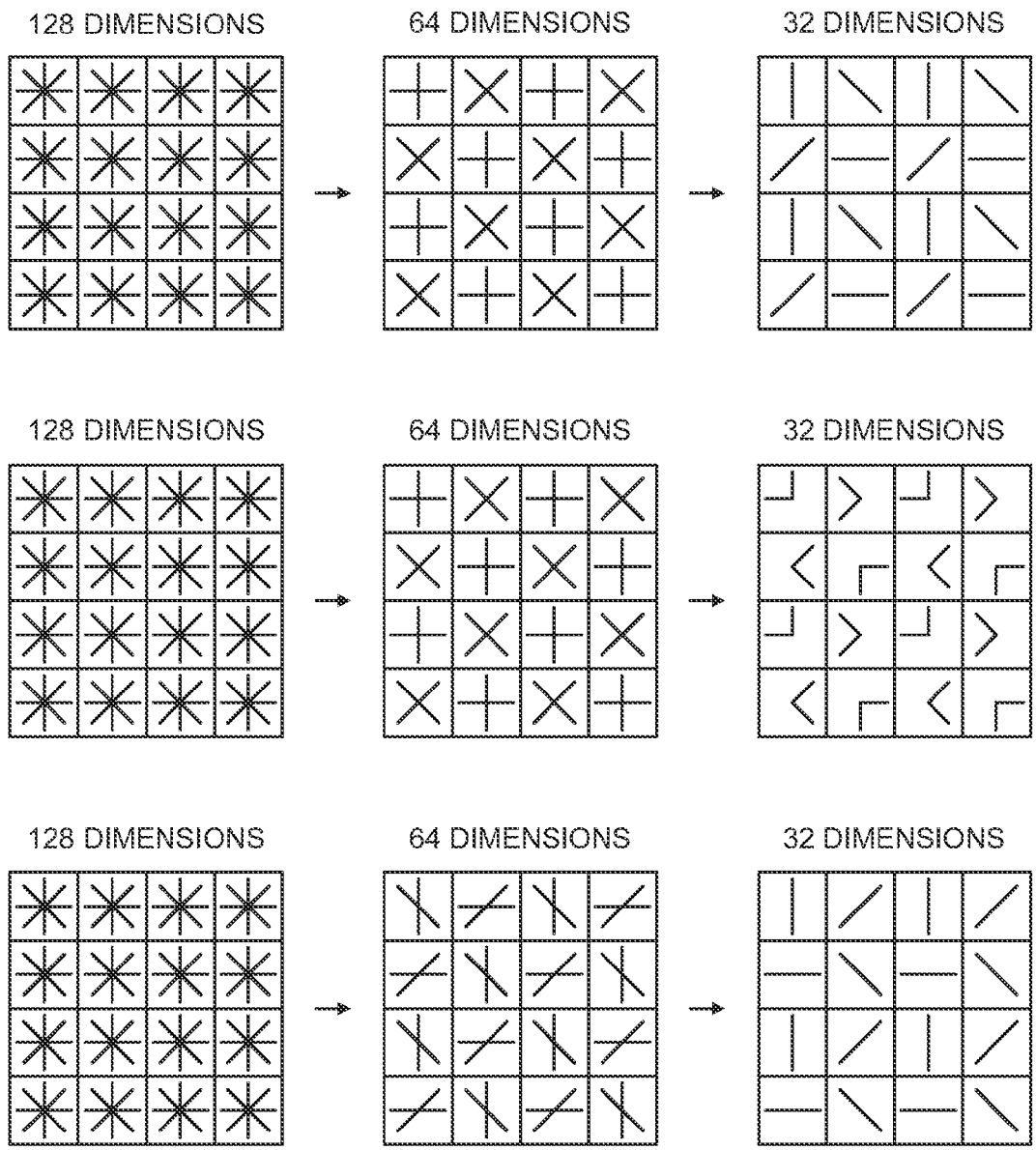
FIG. 2 is a diagram showing examples of selection of dimensions from feature vectors in 128 dimensions.

With reference to FIG. 2 to FIG. 7, a specific example of dimension selection in the dimension selecting unit 18 will be described. FIG. 2 is a diagram showing examples in which dimensions are selected from feature vectors in gradient orientation histograms of 128 dimensions generated by dividing a local region into subregions corresponding to 4×4 blocks and carrying out quantization to obtain eight gradient orientations. In the examples illustrated in FIG. 2, dimensions are selected from feature vectors in 128 dimensions (4×4=16 blocks×8 orientations) which are similar to SIFT feature descriptors.

As shown in FIG. 2, when selecting half of the 128 dimensions, that is, 64 dimensions, the dimension selecting unit 18 may select the dimensions such that dimensions selected from horizontally or vertically adjacent blocks (subregions) are not in the same gradient orientation. FIG. 2 shows an example in which, when quantized orientations in gradient orientation histograms are denoted by "i" (i=0, 1, 2, 3, 4, 5, 6, and 7), blocks from which elements with i=0, 2, 4, and 6 are selected are arranged alternately with blocks from which elements with i=1, 3, 5, and 7 are selected. FIG. 2 also shows another example in which blocks from which elements with i=0, 3, 4, and 7 are selected are arranged alternately with blocks from which elements with i=1, 2, 5, and 6 are selected. In the example illustrated in FIG. 2, a total of eight gradient orientations (dimensions) are selected from adjacent blocks. That is, each of the adjacent blocks complements feature descriptors in the other block.

Furthermore, as shown in FIG. 2, the dimension selecting unit 18 may select the dimensions so that dimensions selected from blocks located at an angle of 45° relative to each other are also not in the same gradient orientation. In an example illustrated in FIG. 2, a total of eight gradient orientations (dimensions) are selected from adjacent 2×2 blocks. That is, in this case, each of the adjacent blocks also complements feature descriptors in the other block.

Thus, the selection is carried out so as to prevent gradient orientations in the adjacent blocks from overlapping and to allow all of the gradient orientations to be evenly selected. Furthermore, dimensions are desirably evenly selected from the entire local region as is the case with the example illustrated in FIG. 2. The method for dimension selection shown in FIG. 2 is illustrative, and the first embodiment is not limited to this method.

Figure 3:
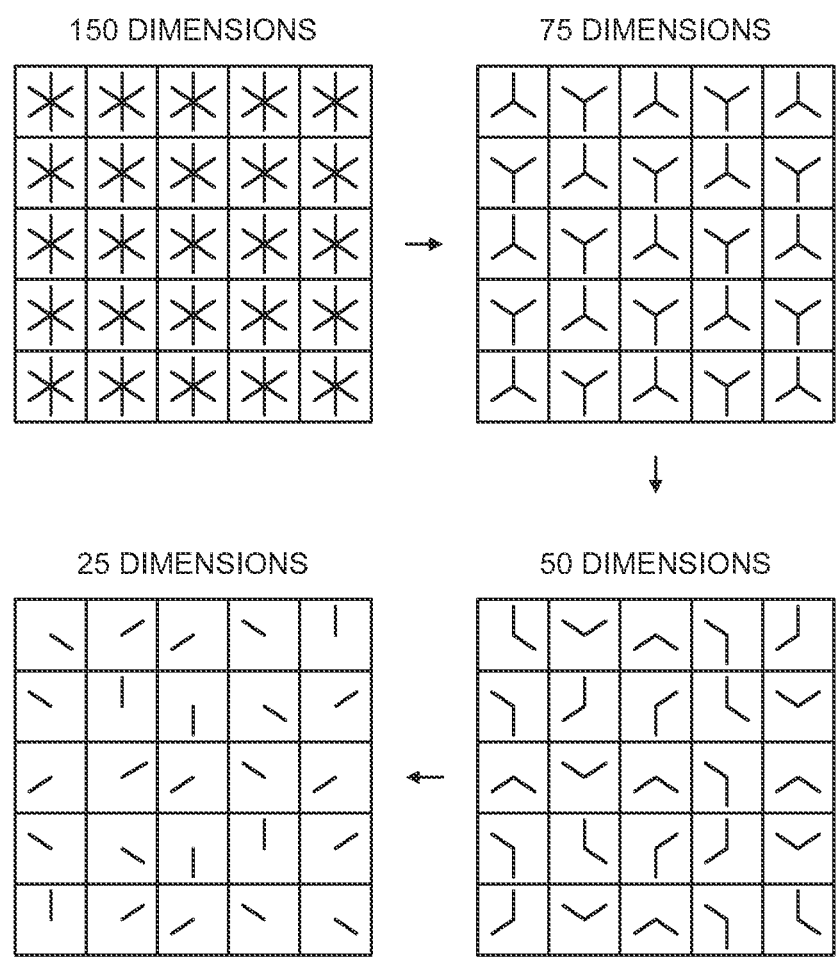
FIG. 3 is a diagram showing other examples of dimension selection.

FIG. 3 is a diagram showing other examples of dimension selection. In the examples illustrated in FIG. 3, the subregion dividing unit 14 divides a local region into subregions corresponding to 5×5=25 blocks. Then, the subregion feature vector generating unit 16 generates a gradient orientation histogram with six orientations in each subregion. That is, as shown in FIG. 3, the subregion feature vector generating unit 16 generates feature vectors with 150 dimensions.

As shown in FIG. 3, when selecting half of the 150 dimensions, that is, 75 dimensions, the dimension selecting unit 18 may select the dimensions such that dimensions selected from horizontally or vertically adjacent blocks are not in the same gradient orientation. In this example, when the quantized orientations in gradient orientation histograms are denoted by "i" (i=0, 1, 2, 3, 4, and 5), blocks from which elements with i=0, 2, and 4 are selected are arranged alternately with blocks from which elements with i=1, 3, and 5 are selected. In the example illustrated in FIG. 3, a total of six gradient orientations are selected from adjacent blocks.

Additionally, when selecting 50 dimensions from the 75 dimensions, the dimension selecting unit 18 may select the dimensions so that only one of the gradient orientations in one of two blocks located at an angle of 45° relative to each other is the same as one of the gradient orientations in the other block (the remaining one orientation in one of the blocks is different from the remaining one orientation in the other block). In addition, when selecting 25 dimensions from the 50 dimensions, the dimension selecting unit 18 may select the dimensions so that none of the gradient orientations selected from one of two blocks located at an angle of 45° relative to each other is the same as the gradient orientations selected from the other block.

In the example illustrated in FIG. 3, the dimension selecting unit 18 selects one gradient orientation from each subregion from the 1st dimension to the 25th dimension, two gradient orientations from each subregion from the 26th dimension to the 50th dimension, and three gradient orientations from subregion from the 51st dimension to the 75th dimension.

Figure 5:
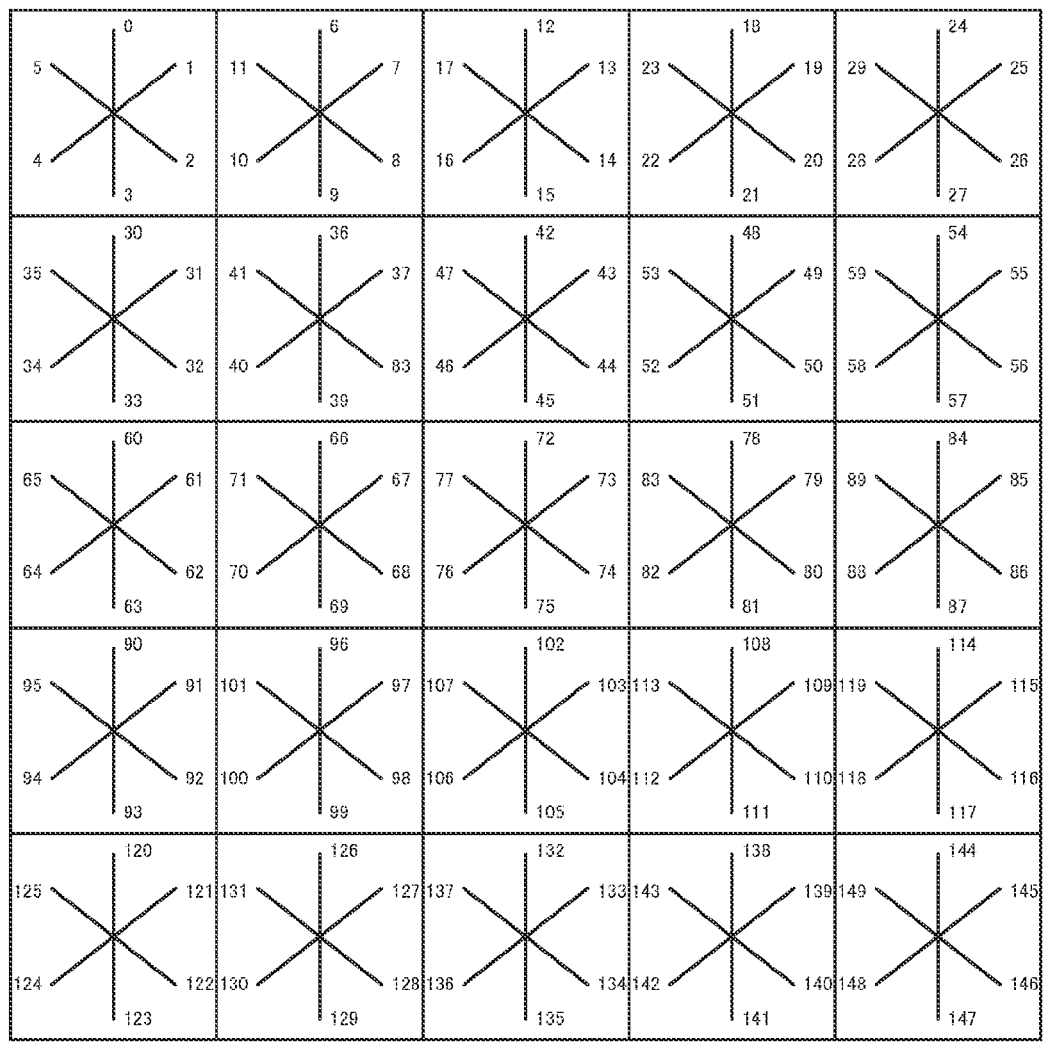
FIG. 5 is a diagram showing an example of the numbers of elements of feature vectors in 150 dimensions.
Figure 6:
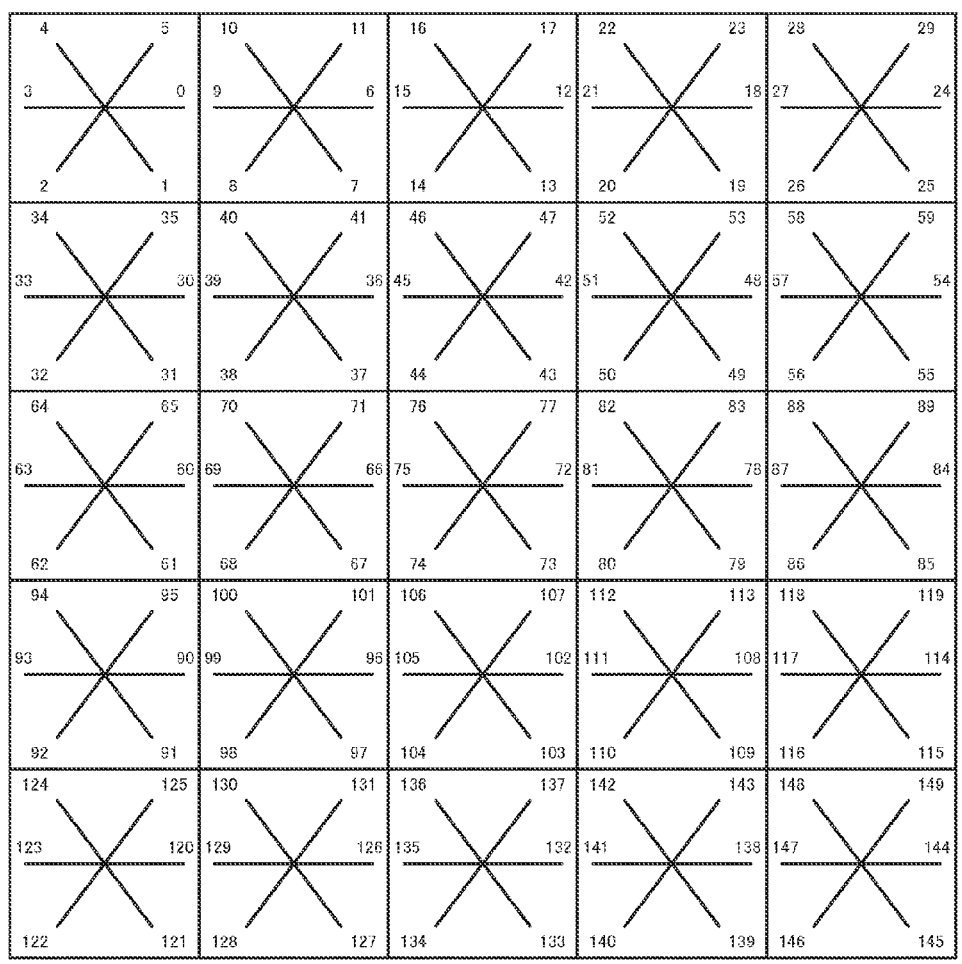
FIG. 6 is a diagram showing another example of the numbers of elements of feature vectors in 150 dimensions.

Furthermore, between the 1st dimension and the 25th dimension, between the 26th dimension and the 50th dimension, and between the 51st dimension and the 75th dimension, the dimension selecting unit 18 may select the dimensions by sequentially adding dimensions, for example, in such order of blocks as shown in FIG. 4. When priorities shown in FIG. 4 are used, the dimension selecting unit 18 may select gradient orientations so that blocks closer to the center have higher priorities. FIG. 5 is a diagram showing an example of the numbers of elements of feature vectors with 150 dimensions. In this example, when 5×5=25 blocks are each represented by a number "b" (b=0, 1, . . . , or 24) in accordance with a raster scan order and the quantized orientation direction is denoted by "i" (i=0, 1, 2, 3, 4, or 5), the number "k" (k=0, 1, . . . , or 149) of each element of a feature vector is k=6×b+i. The gradient orientations shown in FIG. 5 and the corresponding numbers "k" are schematically shown and do not necessarily coincide with gradient orientations on an actual image. For example, an element number 0 is shown as an upward gradient in FIG. 5 but is often associated with a gradient of a 0° orientation in an image coordinate system on the actual image. By way of example, FIG. 6 shows association of gradient orientations different from the association shown in FIG. 5. The association in FIG. 6 may be more similar, than the association in FIG. 5, to the association on the actual image in the image coordinate system, but no essential difference is present between the associations in FIGS. 5 and 6.

Figure 7:
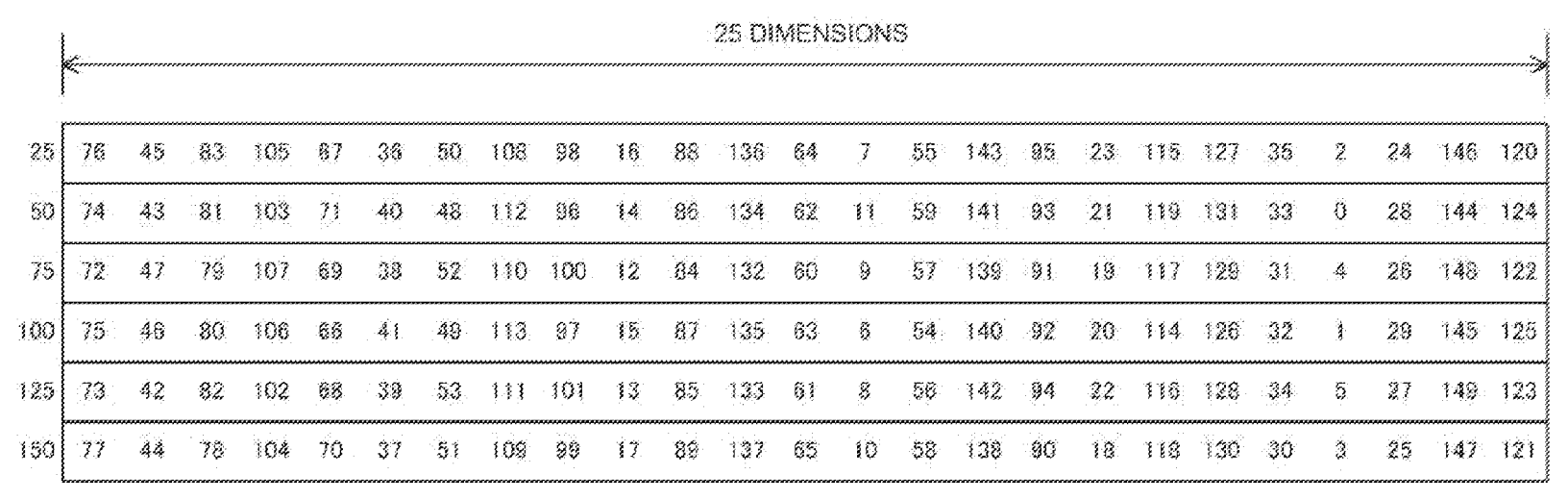

Furthermore, FIG. 7 is a diagram showing a configuration example of a local feature descriptor obtained by selecting the elements shown in FIG. 5 or FIG. 6 in accordance with the priorities shown in FIG. 4. For example, the dimension selecting unit 18 may output the dimensions (elements) in the order shown in FIG. 7. Specifically, in outputting, for example, the local feature descriptor of 150 dimensions, the dimension selecting unit 18 may output all of the elements of 150 dimensions in the order shown in FIG. 7. Additionally, when outputting, for example, the local feature descriptor of 25 dimensions, the dimension selecting unit 18 may output the elements in the first row shown in FIG. 7 (the 76th element, the 45th element, the 83th element, . . . , and the 120th element) in the order shown in FIG. 7 (from left to right). In addition, when outputting, for example, the local feature descriptor of 50 dimensions, the dimension selecting unit 18 may output, in addition to the elements in the first row shown in FIG. 7, the elements in the second row shown in FIG. 7 in the order shown in FIG. 7 (from left to right).

In the example illustrated in FIG. 7, the local feature descriptor has a layered structure. That is, for example, the arrangement of elements of the local feature descriptor of the leading 25 dimensions is the same for the local feature descriptor of 25 dimensions and the local feature descriptor of 150 dimensions. Thus, by selecting the dimensions in a layered manner (progressively), the dimension selecting unit 18 may extract and output the local feature descriptor of any number of dimensions, that is, the local feature descriptor of any size, according to an application, a communication capacity, specifications for a terminal or the like. Furthermore, by selecting dimensions in a layered manner, rearranging the dimensions based on the priorities, and outputting the rearranged dimensions, the dimension selecting unit 18 may match images against each other using the local feature descriptors of different numbers of dimensions. For example, when images are matched against each other using the local feature descriptor of 75 dimensions and the local feature descriptor of 50 dimensions, it is possible to calculate the distance between the local feature descriptors using only the leading 50 dimensions.

The priorities shown in FIG. 4 to FIG. 7 are illustrative, and the order for selection of the dimensions is not limited to these priorities. For example, the blocks may be selected in such an order as shown in FIG. 8A or FIG. 8B instead of the order shown in the example in FIG. 4. Furthermore, for example, the priorities may be set so as to evenly select the dimensions from all of the subregions. Alternatively, the priorities may be set such that, with importance placed on the neighborhood of the center of the local region, the frequency of selection is higher in subregions near the center. Additionally, information on the order of dimension selection may, for example, be specified in a program or stored in a table or the like (selection order storage unit) which is referenced when the program is executed.

Figure 9A:
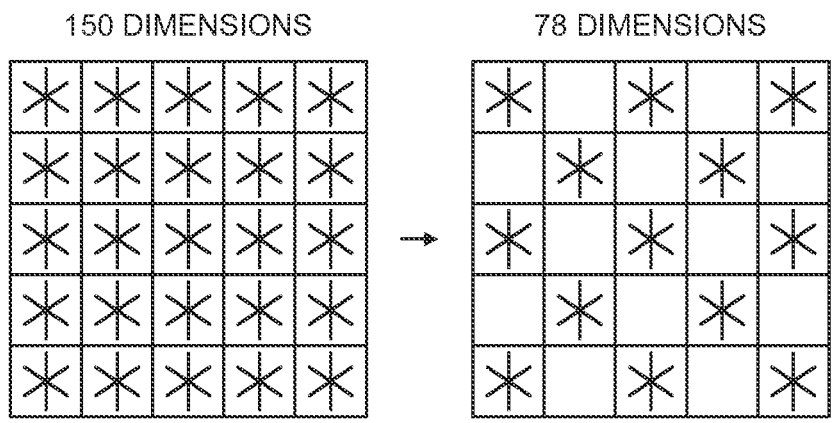
FIGS. 9A and 9B are diagrams showing another example of priorities for selection of dimensions.
Figure 9B:
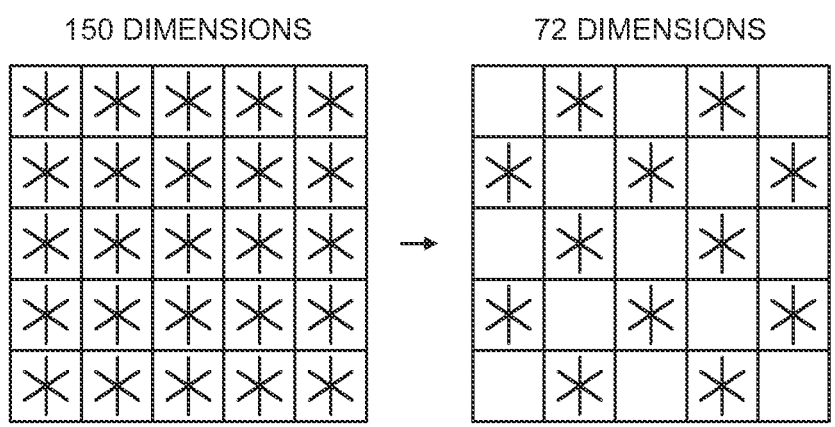

Alternatively, the dimension selecting unit 18 may carry out such a selection as shown in FIG. 9A or FIG. 9B. In this case, 6 dimensions are selected from some subregions, whereas 0 dimensions is selected from the other subregions, which are proximate to the certain subregions. Also in such a case, the dimensions are selected for each of the subregions so as to reduce the correlation between the proximate subregions.

Figure 10:
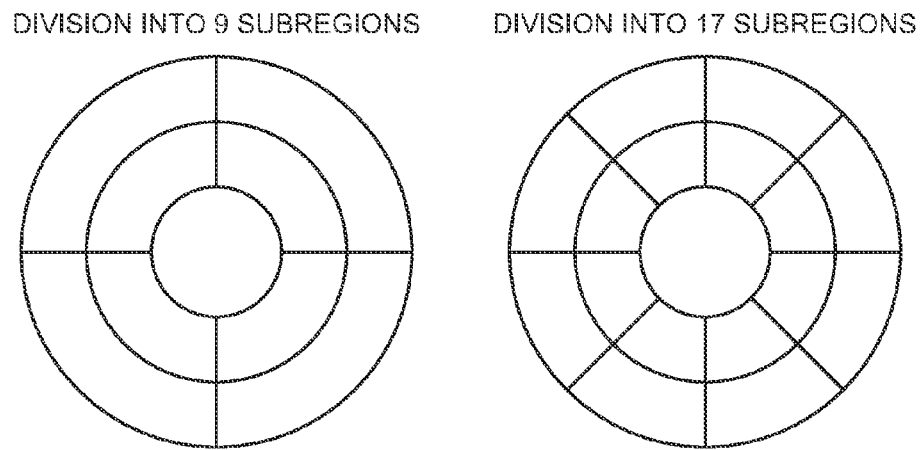
FIG. 10 is a diagram showing an example of a circular local region.
Figure 11:
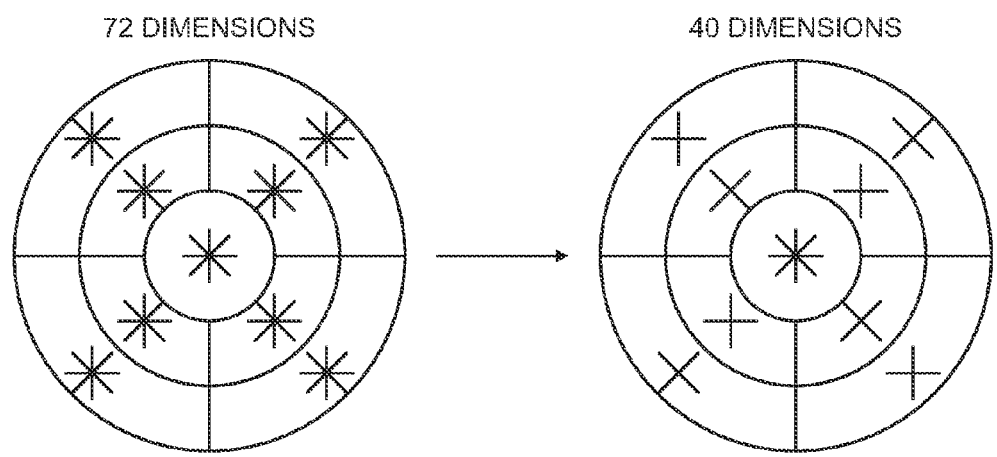
FIG. 11 is a diagram showing an example of dimension selection for a circular local region.

Furthermore, the shape of the local region and the subregion is not limited to the square as shown in FIG. 2 and FIG. 3 but may be optional. For example, as shown in FIG. 10, the local region acquiring unit 12 may acquire a circular local region. In this case, as shown in FIG. 10, the subregion dividing unit 14 may divide a circular local region into, for example, 9 subregions or 17 subregions. Also in this case, the dimension selecting unit 18 may select dimensions from each subregion, for example, as shown in FIG. 11. In the example illustrated in FIG. 11, when 40 dimensions are selected from 72 dimensions, culling of dimensions is not carried out on a central subregion.

Figure 12:
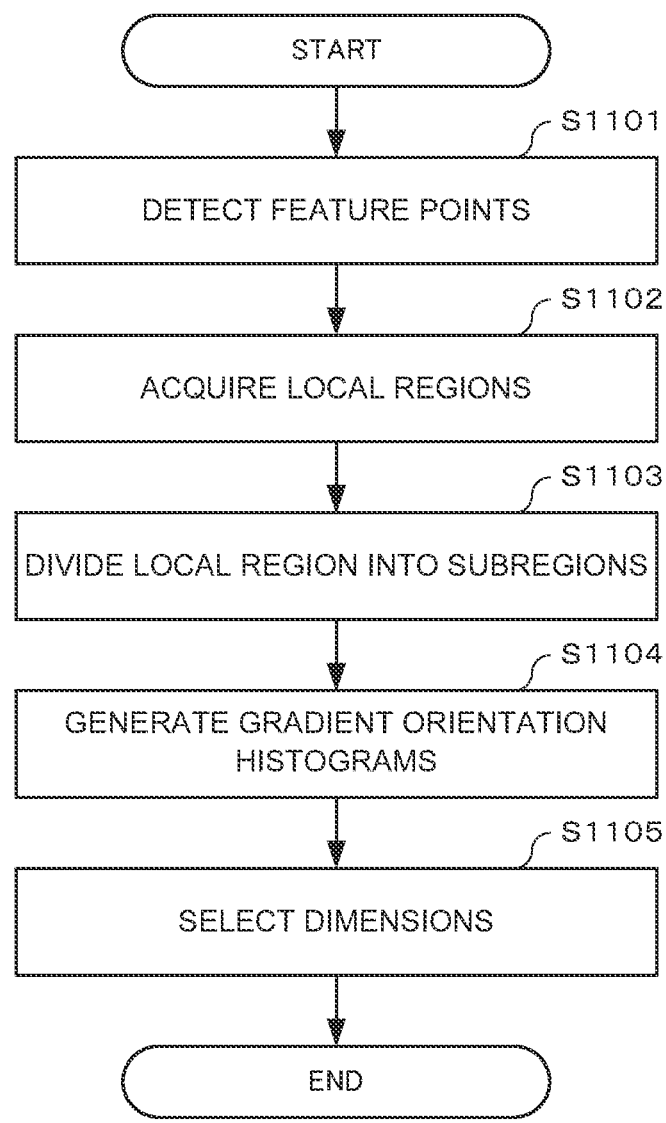
FIG. 12 is a flowchart showing an example of processing in the local feature descriptor extracting apparatus.

FIG. 12 is a flowchart showing an example of processing in the local feature descriptor extracting apparatus 1A. First, the feature point detecting unit 10 detects feature points in an image, and outputs the coordinate position, scale (size), and orientation of each of the feature points (S1101). When the feature points are detected, the local region acquiring unit 12 acquires a local region from which feature descriptors are to be extracted based on the coordinate position, scale, and orientation of each of the detected feature points (S1102). Then, the subregion dividing unit 14 divides the local region into subregions (S1103). The subregion feature vector generating unit 16 generates a gradient orientation histogram for each of the subregions in the local region (S1104). Finally, the dimension selecting unit 18 selects dimensions (elements) to be output as a local feature descriptor in accordance with a specified order of selection (S1105).

Thus, in the local feature descriptor extracting apparatus 1A according to the first embodiment, the dimension selecting unit 18 selects the dimensions (elements) to be output as a local feature descriptor so as to reduce the correlation between proximate subregions based on the positional relations among the subregions. In other words, the proximate subregions often have a high correlation, and thus, the dimension selecting unit 18 may select the dimensions so as to prevent the dimensions (elements) of the same feature vector from being selected from proximate subregions. Thus, the size of feature descriptors can be reduced with the accuracy of object identification maintained.

Furthermore, the dimension selecting unit 18 may output a local feature descriptor in a layered manner (progressively) as illustrated in FIG. 7. This even enables matching of the local feature descriptor of a certain number of selected dimensions against the local feature descriptor of a different number of selected dimensions (a different size of feature descriptors) (distance calculations).

Furthermore, the dimension selecting unit 18 selects dimensions based on the positional relations among the subregions, and thus, does not need to carry out learning in selecting the dimensions. That is, generalized extraction of a local feature descriptor may be carried out without depending on data (image).

In the local feature descriptor extracting apparatus 1A, the orders of the processing in the subregion feature vector generating unit 16 and the processing in the dimension selecting unit 18 may be changed to each other. That is, the local feature descriptor extracting apparatus 1A may allow for a process in which, after the dimension selecting unit 18 selects dimensions, the subregion feature vector generating unit 16 generates feature vectors with the selected dimensions.

Second Embodiment

Figure 13:
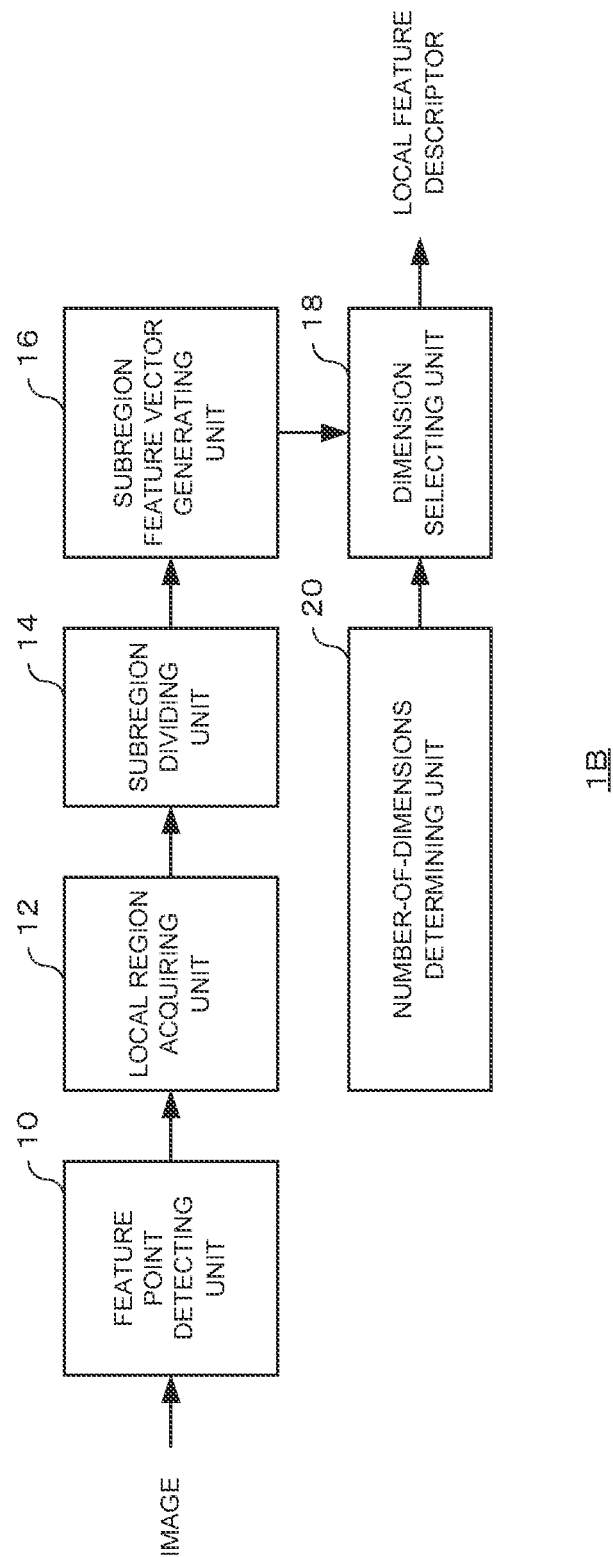
FIG. 13 is a diagram showing a configuration of a local feature descriptor extracting apparatus according to a second embodiment of the present invention.

Now, a second embodiment will be described below. FIG. 13 shows a configuration of a local feature descriptor extracting apparatus according to the second embodiment of the present invention. The second embodiment enables the number of dimensions selected to be changed. As shown in FIG. 13, a local feature descriptor extracting apparatus 1B is configured to include a feature point detecting unit 10, a local region acquiring unit 12, a subregion dividing unit 14, a subregion feature vector generating unit 16, a number-of-dimensions determining unit 20, and a dimension selecting unit 18. Thus, the configuration of the local feature descriptor extracting apparatus 1B corresponds to the local feature descriptor extracting apparatus 1A according to the first embodiment to which the number-of-dimensions determining unit 20 is added. The same components of the second embodiment as the corresponding components of the first embodiment are denoted by the same reference numerals and will not be described below.

The number-of-dimensions determining unit 20 may determine the number of dimensions selected by the dimension selecting unit 18. For example, the number-of-dimensions determining unit 20 may determine the number of dimensions by receiving information indicative of the number of dimensions from a user. The information indicative of the number of dimensions does not necessarily indicate the number of dimensions itself but may indicate, for example, search accuracy or search speed. Specifically, for example, upon receiving an input requesting increased search accuracy, the number-of-dimensions determining unit 20 may determine the number of dimensions to an increased value. Furthermore, for example, upon receiving an input requesting reduced search accuracy, the number-of-dimensions determining unit 20 may determine the number of dimensions to a reduced value.

Furthermore, the number-of-dimensions determining unit 20 may determine the number of dimensions based on an application for which the local feature descriptor extracting apparatus 1B is used, a communication capacity, processing specifications for the terminal, or the like. Specifically, for example, when the communication capacity is small (communication speed is low), the number-of-dimensions determining unit 20 may determine the number of dimensions to a value smaller than the number of dimensions selected when the communication capacity is large (communication speed is high). Alternatively, for example, when the processing specifications for the terminal are low, the number-of-dimensions determining unit 20 may determine the number of dimensions to a value smaller than the number of dimensions selected when the processing specifications are high. Alternatively, the number-of-dimensions determining unit 20 may dynamically determine the number of dimensions according to processing loads on the terminal. Alternatively, for example, when the size of the local feature descriptor that can be used for the entire image is determined, the number-of-dimensions determining unit 20 may determine the number of dimensions selected from each feature point by inversely calculating the number of feature points extracted from the entire image.

The number-of-dimensions determining unit 20 may determine the same number of dimensions for all of the feature points detected in the image or determine different numbers of dimensions for the respective feature points. For example, upon being provided the importance of feature points via external information, the number-of-dimensions determining unit 20 may determine a larger number of dimensions for more important feature points, while determining a smaller number of dimensions for less important feature points.

For example, the number-of-dimensions determining unit 20 may determine the importance depending on the area in the image. Specifically, the number-of-dimensions determining unit 20 may consider feature points in the center of the image to be more important than feature points in a peripheral portion of the image and determine the number of dimensions so as to provide more dimensions for the feature points in the center of the image.

Furthermore, for example, the number-of-dimensions determining unit 20 may determine the importance of feature points based on feature vectors. Specifically, for example, the number-of-dimensions determining unit 20 may reference the value of a feature vector, and when the feature vector can be determined to correspond to a frequently appearing pattern, consider the feature vector not to be very useful as a local feature descriptor for identification and determine the feature point to be less important. In contrast, in such a case, the number-of-dimensions determining unit 20 may increase the number of dimensions to enhance the capability of identification.

Alternatively, for example, the number-of-dimensions determining unit 20 may determine the importance of each feature point based on relations with the values of the feature vectors of the other feature points in the image. Specifically, for example, by comparing the value of each feature vector with the values of the feature vectors of the other feature points, the number-of-dimensions determining unit 20 may determine whether the feature vector corresponds to a frequently appearing pattern, and based on the result of the determination, determine the importance of the feature point.

Alternatively, for example, the number-of-dimensions determining unit 20 may determine the importance of each feature point based on information obtained when the feature point detecting unit 10 detects feature points. Specifically, for example, the number-of-dimensions determining unit 20 may determine the importance of each feature point based on information on the scales of the feature points. For example, the number-of-dimensions determining unit 20 may determine feature points with larger scale values to be more important.

Based on the number of dimensions determined by the number-of-dimensions determining unit 20, the dimension selecting unit 18 may select dimensions for the feature vectors and output the dimensions as a local feature descriptor similarly to the dimension selecting unit 18 according to the first embodiment. As described above, the number of dimensions selected may be the same for all of the feature points detected in the image or vary among the feature points.

Thus, in the local feature descriptor extracting apparatus 1B according to the second embodiment, the number-of-dimensions determining unit 20 may determine the number of dimensions selected by the dimension selecting unit 18. Thus, the appropriate number of dimensions can be determined based on a user input, the communication capacity, the processing specifications for the terminal, or the like.

Third Embodiment

Figure 14:
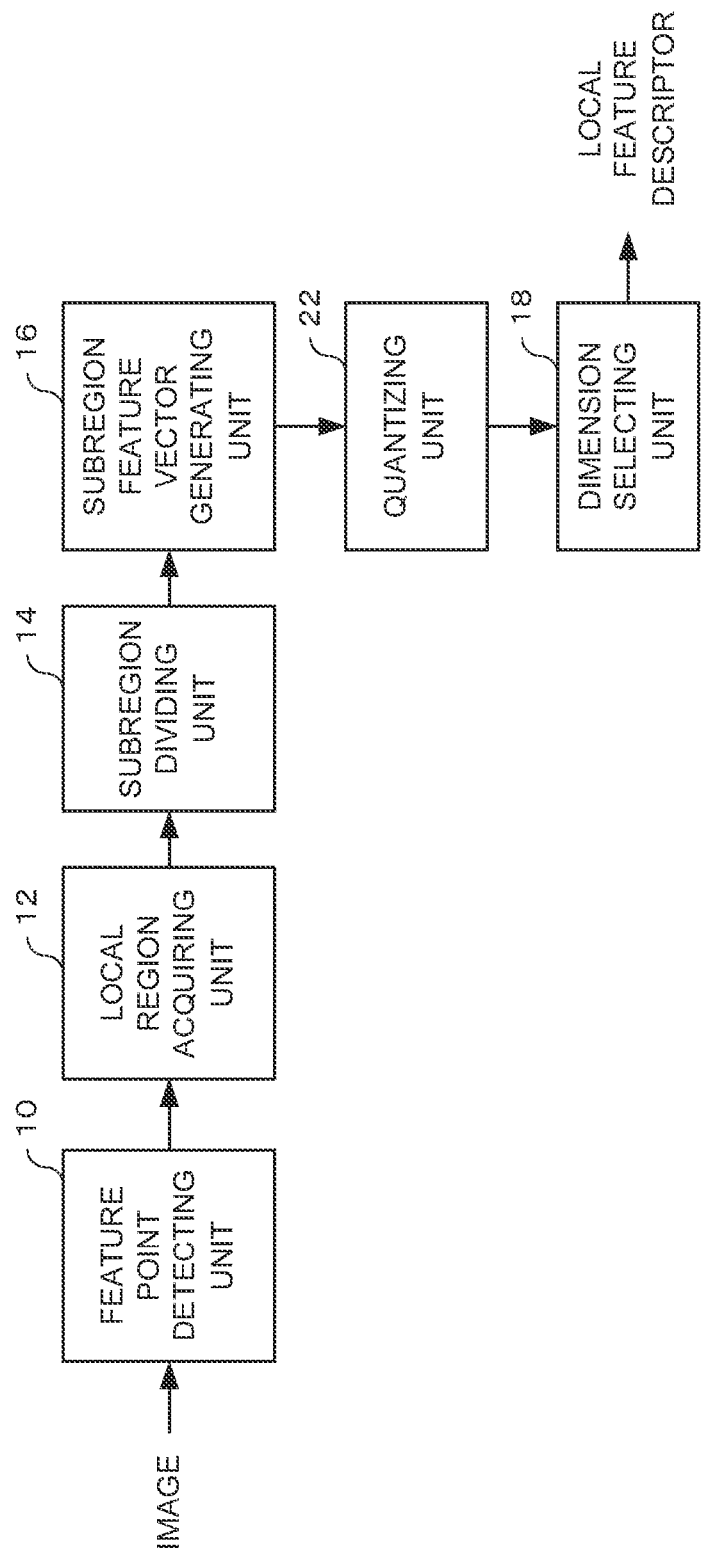
FIG. 14 is a diagram showing a configuration of a local feature descriptor extracting apparatus according to a third embodiment of the present invention.

Now, a third embodiment will be described. FIG. 14 is a diagram showing a configuration of a local feature descriptor extracting apparatus according to the third embodiment of the present invention. The third embodiment enables a further reduction in the size of the local feature descriptor by quantizing feature vectors. As shown in FIG. 14, a local feature descriptor extracting apparatus 1C is configured to include a feature point detecting unit 10, a local region acquiring unit 12, a subregion dividing unit 14, a subregion feature vector generating unit 16, a dimension selecting unit 18, and a quantizing unit 22. Thus, the configuration of the local feature descriptor extracting apparatus 1C corresponds to the local feature descriptor extracting apparatus 1A according to the first embodiment to which the quantizing unit 22 is added. The same components of the second embodiment as the corresponding components of the first embodiment are denoted by the same reference numerals and will not be described below.

The quantizing unit 22 may quantize dimensions in a gradient orientation histogram output by the subregion feature vector generating unit 16 into N values. Any quantizing technique may be used in the quantizing unit 22. The quantizing unit 22 may individually quantize the dimensions instead of collectively quantizing a plurality of dimensions using vector quantization or the like. Thus, even after quantization is carried out, the dimension selecting unit 18 may select dimensions as is the case with the first embodiment.

Figure 15:
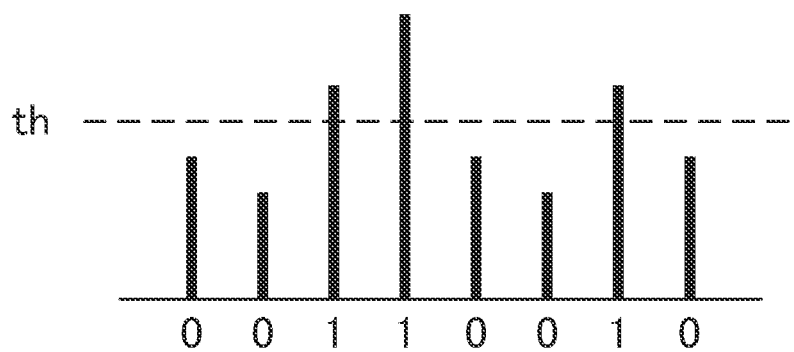
FIG. 15 is a diagram showing an example of quantization of dimensions in a gradient orientation histogram into binaries.

A specific example of quantization will be described. For example, for N=2, the quantizing unit 22 may quantize dimensions in a gradient orientation histogram into binaries as shown in FIG. 15. Here, the number of gradient orientations in the gradient orientation histogram is denoted by D (for example, D=6 or D=8), and a value for each subregion in the gradient orientation histogram is denoted by hi (i=0, . . . , D−1). The quantizing unit 22 may determine a quantized value qi of hi (i=0, . . . , D−1) based on Formula (3).

[Formula 3]

$$q_i = \begin{cases} 1 & (\text{if } h_i > th) \\ 0 & (\text{if } h_i \le th) \end{cases} \tag{3}$$

Furthermore, the quantizing unit 22 may calculate a threshold th, for example, using Formula (4).

[Formula 4]

$$th = \alpha \sum_{i=0}^{D-1} h_i \tag{4}$$

In this case, $\alpha$ denotes a predetermined coefficient. $\alpha$ may have the same value for all of the subregions or have a value varying among the subregions.

Furthermore, the threshold calculated using Formula (4) is illustrative, and the quantizing unit 22 may calculate the threshold th based on another formula. For example, the quantizing unit 22 may determine the threshold th by calculating th=$\alpha$·max (hi: i=0, . . . , D−1). Alternatively, the quantizing unit 22 may set the threshold such that approximately half of the quantized values are either 0 or 1. Specifically, the quantizing unit 22 may determine the former half of the quantized values resulting from sorting of hi (i=0, . . . , D−1) in ascending order to be 0, while determining the latter half of the quantized values to be 1.

Alternatively, the quantizing unit 22 may set the threshold th for each subregion or for the entire local region. For example, the quantizing unit 22 may calculate the threshold th in accordance with Formula (4) using the value in the gradient orientation histogram for the entire local region rather than the value for each subregion, thus setting the threshold th for the entire local region.

As described above, in the local feature descriptor extracting apparatus 1C according to the third embodiment, the quantizing unit 22 quantizes feature vectors to enable a further reduction in the size of the local feature descriptor.

Fourth Embodiment

Figure 16:
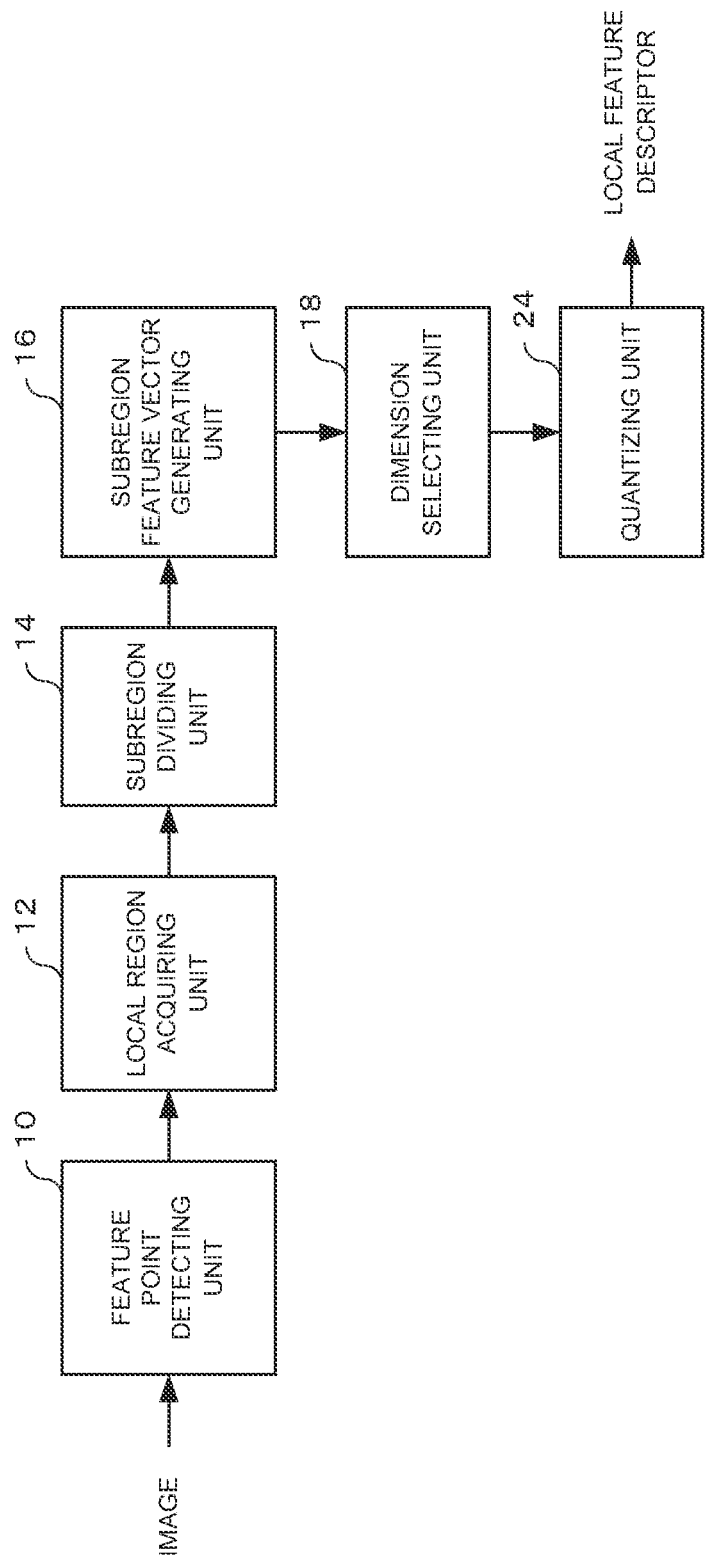
FIG. 16 is a diagram showing a configuration of a local feature descriptor extracting apparatus according to a fourth embodiment of the present invention.

Now, a fourth embodiment will be described. FIG. 16 is a diagram showing a configuration of a local feature descriptor extracting apparatus according to the fourth embodiment of the present invention. The fourth embodiment carries out quantization after dimensions are selected, enabling a further reduction in the size of the local feature descriptor. As shown in FIG. 16, a local feature descriptor extracting apparatus 1D is configured to include a feature point detecting unit 10, a local region acquiring unit 12, a subregion dividing unit 14, a subregion feature vector generating unit 16, a dimension selecting unit 18, and a quantizing unit 24. Thus, the configuration of the local feature descriptor extracting apparatus 1D corresponds to the local feature descriptor extracting apparatus 1A according to the first embodiment to which the quantizing unit 24 is added. The same components of the fourth embodiment as the corresponding components of the first embodiment are denoted by the same reference numerals and will not be described below.

Like the quantizing unit 22 according to the third embodiment, the quantizing unit 24 can individually quantize the dimensions of feature vectors. Moreover, the quantizing unit 24 can collectively quantize a plurality of dimensions of feature vectors, for example, by using vector quantization.

Thus, in the local feature descriptor extracting apparatus 1D according to the fourth embodiment, the quantizing unit 24 quantizes feature vectors to enable a further reduction in the size of the local feature descriptor. Furthermore, when the quantizing unit 24 collectively quantizes a plurality of dimensions, the fourth embodiment can reduce the number of dimensions to be quantized and thus throughput needed for quantization compared to the third embodiment.

Fifth Embodiment

Figure 17:
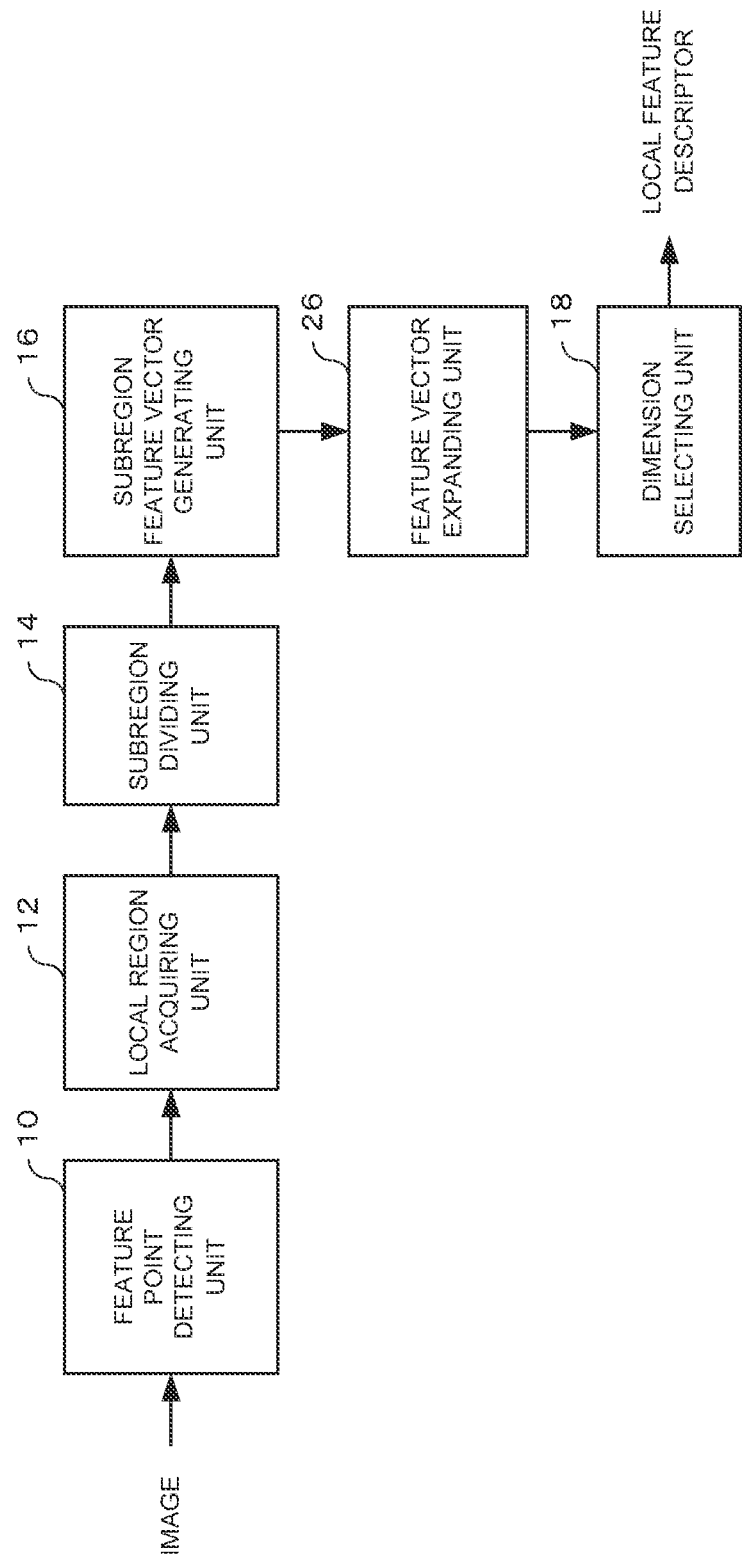
FIG. 17 is a diagram showing a configuration of a local feature descriptor extracting apparatus according to a fifth embodiment of the present invention.

Now, a fifth embodiment will be described. FIG. 17 is a diagram showing a configuration of a local feature descriptor extracting apparatus according to the fifth embodiment of the present invention. As shown in FIG. 17, a local feature descriptor extracting apparatus 1E is configured to include a feature point detecting unit 10, a local region acquiring unit 12, a subregion dividing unit 14, a subregion feature vector generating unit 16, a dimension selecting unit 18, and a feature vector expanding unit 26. Thus, the configuration of the local feature descriptor extracting apparatus 1E corresponds to the local feature descriptor extracting apparatus 1A according to the first embodiment to which the feature vector expanding unit 26 is added. The same components of the fifth embodiment as the corresponding components of the first embodiment are denoted by the same reference numerals and will not be described below. Furthermore, the feature vector expanding unit 26 is applicable not only to the local feature descriptor extracting apparatus according to the first embodiment but also to the local feature descriptor extracting apparatuses according to the other embodiments.

By using feature vectors output by the subregion feature vector generating unit 16 to generate dimensions at a larger scale (expanded division areas), the feature vector expanding unit 26 can expand the feature vectors. The feature vector expanding unit 26 may expand feature vectors using information only on the feature vectors output by the subregion feature vector generating unit 16. This eliminates the need to return to the original image to carry out extraction for expanding feature vectors. Thus, processing time needed to expand feature vectors is very short compared to processing time needed to generate feature vectors from the original image.

For example, the feature vector expanding unit 26 may synthesize gradient orientation histograms for adjacent subregions into new gradient orientation histograms. For example, the feature vector expanding unit 26 may summate gradient orientation histograms of adjacent 2×2=4 blocks (summate elements with the same gradient) based on gradient orientation histograms of N×N blocks (N×N×D dimensions) resulting from division carried out by the subregion dividing unit 14 to generate gradient orientation histograms of (N−1)×(N−1) blocks ((N−1)×(N−1)×D dimensions). Thus, the feature vector expanding unit 26 may generate gradient orientation histograms at a scale of (2×2 blocks) based on the original feature vectors. The thus generated feature vectors are new information (histogram information at a larger scale) not contained in the original feature vectors, thus enabling the accuracy of identification to be improved. Furthermore, blocks taken into account for expansion are not limited to 2×2 blocks. For example, the feature vector expanding unit 26 may summate gradient orientation histograms of 3×3 blocks into gradient orientation histograms of (N−2)×(N−2) blocks ((N−2)×(N−2)×D dimensions). Thus, the feature vector expanding unit 26 may sequentially increase the block size to gradient orientation histograms at layered scales.

Figure 18:
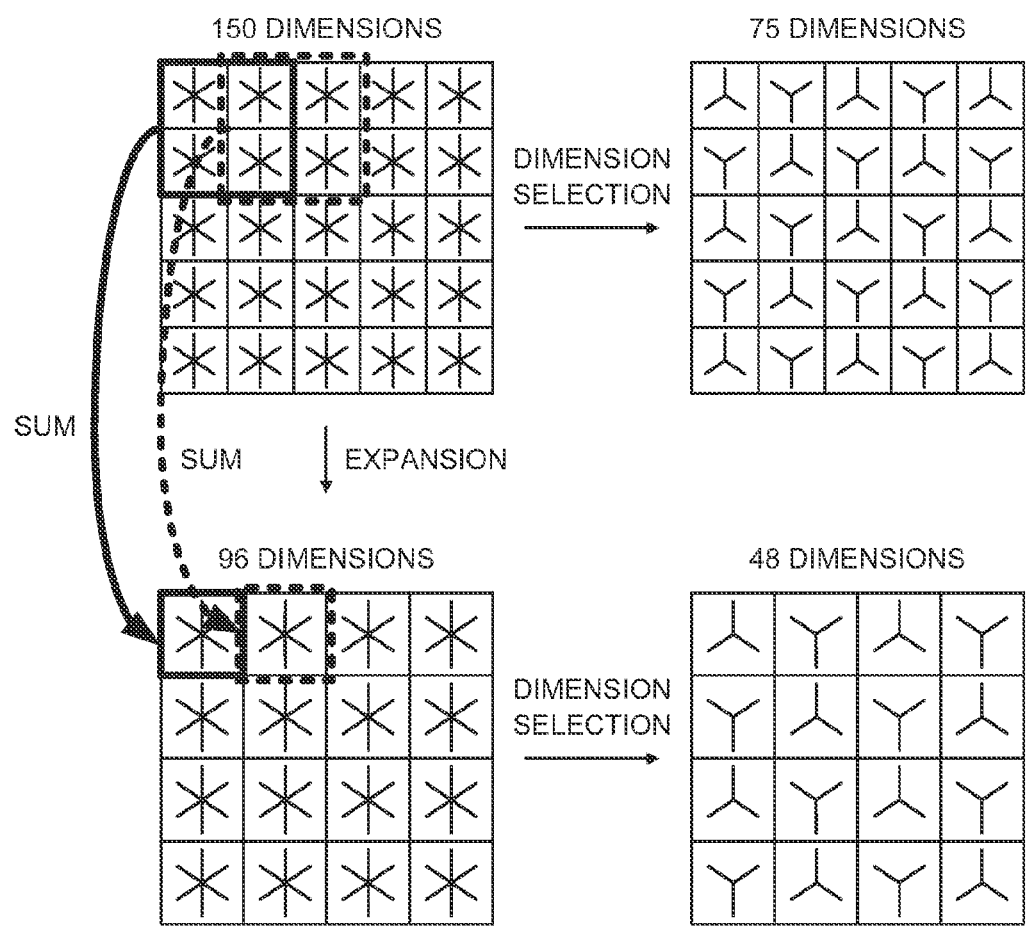
FIG. 18 is a diagram showing an example of expansion of feature vectors.
Figure 19:
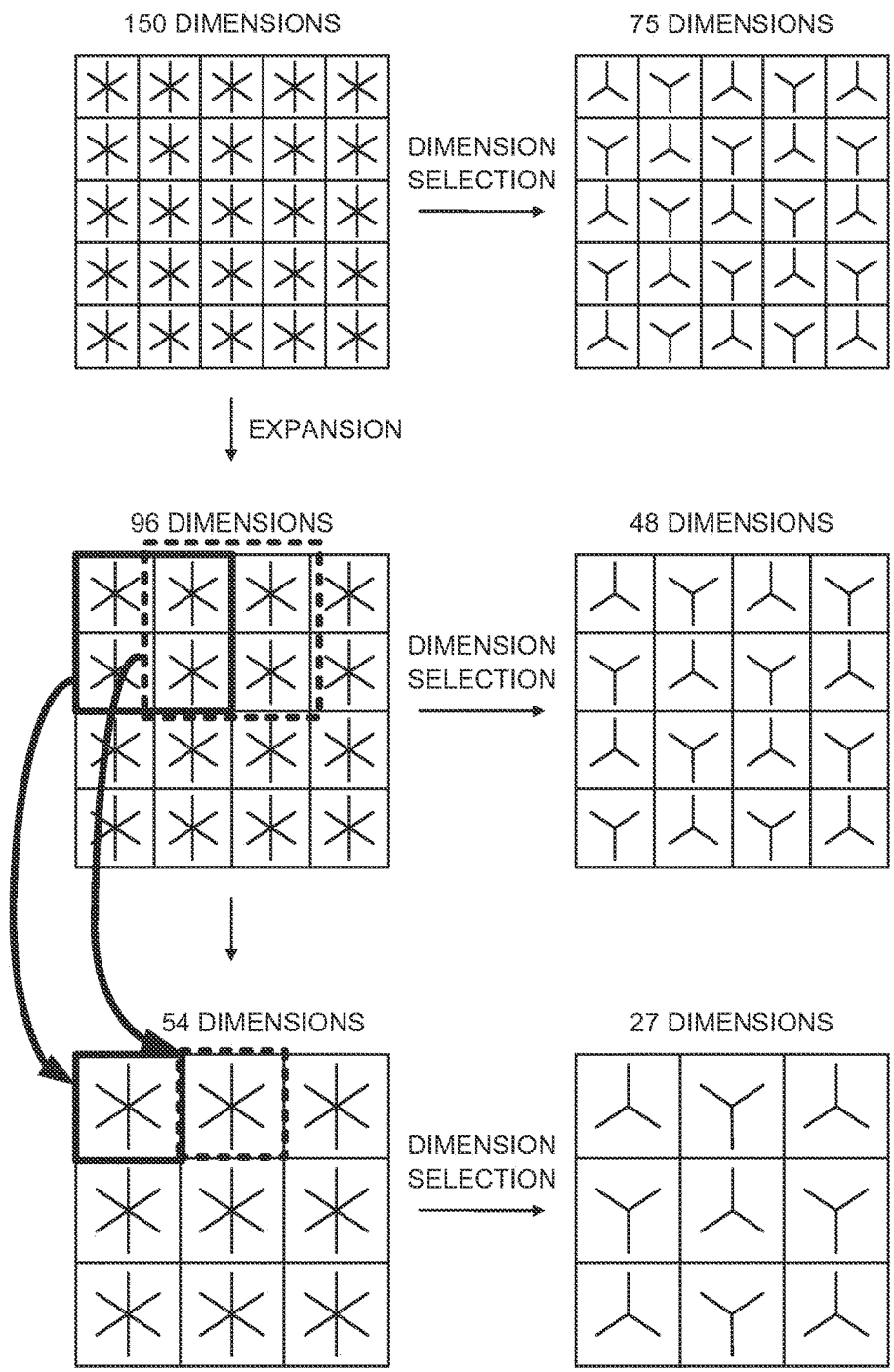
FIG. 19 is a diagram showing an example of expansion of feature vectors.

FIG. 18 shows an example of expansion of feature vectors by summation of gradient orientation histograms of 2×2 blocks (summation of elements with the same gradient). As shown in FIG. 18, the feature vector expanding unit 26 may expand gradient orientation histograms of 5×5×6 dimensions (150 dimensions) into gradient orientation histograms of 4×4×6 dimensions (96 dimensions).

In an example illustrated in FIG. 18, when blocks in a layer of 5×5=25 blocks (hereinafter referred to as a layer 1) are denoted by a number b1 (b1=0, 1, . . . , 24) in accordance with the raster scan order and blocks in a layer of 4×4=16 blocks (hereinafter referred to as a layer 2) resulting from expansion are denoted by a number b2 (b2=0, 1, . . . , 15) in accordance with the raster scan order, a histogram of a block b2=0 is generated from blocks b1=0, 1, 5, and 6, a block b2=1 is generated from blocks b1=1, 2, 6, and 7, a block b2=2 is generated from blocks b1=2, 3, 7, and 8, a block b2=3 is generated from blocks b1=3, 4, 8, and 9, a block b2=4 is generated from blocks b1=5, 6, 10, and 11, a block b2=5 is generated from blocks b1=6, 7, 11, and 12, a block b2=6 is generated from blocks b1=7, 8, 12, and 13, a block b2=7 is generated from blocks b1=8, 9, 13, and 14, a block b2=8 is generated from blocks b1=10, 11, 15, and 16, a block b2=9 is generated from blocks b1=11, 12, 16, and 17, a block b2=10 is generated from blocks b1=12, 13, 17, and 18, a block b2=11 is generated from blocks b1=13, 14, 18, and 19, a block b2=12 is generated from blocks b1=15, 16, 20, and 21, a block b2=13 is generated from blocks b1=16, 17, 21, and 22, a block b2=14 is generated from blocks b1=17, 18, 22, and 23, and a block b2=15 is generated from blocks b1=18, 19, 23, and 24.

Similarly, the feature vector expanding unit 26 may summate gradient orientation histograms of adjacent 3×3 blocks based on gradient orientation histograms of 5×5×6 dimensions (150 dimensions) to generate gradient orientation histograms of 3×3×6 dimensions (54 dimensions). Furthermore, based on gradient orientation histograms of 4×4×6 dimensions (96 dimensions) resulting from expansion, the feature vector expanding unit 26 may generate further expanded gradient orientation histograms. For example, by summating gradient orientation histograms of 2×2 blocks based on gradient orientation histograms of 4×4×6 dimensions (96 dimensions) resulting from expansion, the feature vector expanding unit 26 may further generate gradient orientation histograms of 3×3×6 dimensions (54 dimensions), as shown in FIG. 18.

In this example, when blocks in a layer of 3×3=9 blocks (hereinafter referred to as a layer 3) are denoted by a number b3 (b3=0, 1, . . . , 8) in accordance with the raster scan order, a histogram of a block b3=0 is generated from blocks b2=0, 1, 4, and 5,
a block b3=1 is generated from blocks b2=1, 2, 5, and 6
a block b3=2 is generated from blocks b2=2, 3, 6, and 7,
a block b3=3 is generated from blocks b2=4, 5, 8, and 9,
a block b3=4 is generated from blocks b2=5, 6, 9, and 10
a block b3=5 is generated from blocks b2=6, 7, 10, and 11
a block b3=6 is generated from blocks b2=8, 9, 12, and 13,
a block b3=7 is generated from blocks b2=9, 10, 13, and 14, and
a block b3=8 is generated from blocks b2=10, 11, 14, and 15.

Figure 20:
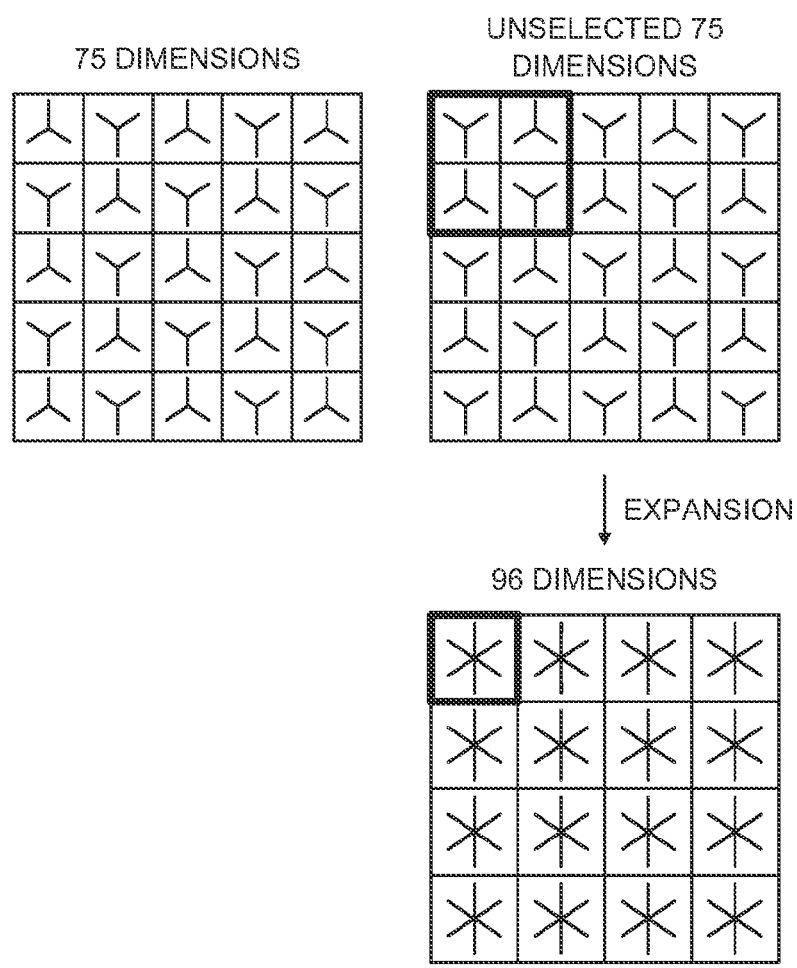
FIG. 20 is a diagram showing an example of expansion of a gradient orientation histogram using dimensions different from dimensions selected by a post-stage dimension selecting unit.

Furthermore, the feature vector expanding unit 26 may expand gradient orientation histograms using dimensions different from dimensions selected by the succeeding dimension selecting unit 18. FIG. 20 shows a specific example. For example, when the dimension selecting unit 18 selects 75 dimensions from gradient orientation histograms of 150 dimensions, the feature vector expanding unit 26 may expand the remaining (unselected) 75 dimensions into gradient orientation histograms of 96 dimensions.

For example, it is assumed that, at the layer 1, 75 dimensions are selected in accordance with the priorities shown in FIG. 7. In this case, when quantized gradient orientations in a gradient orientation histogram are denoted by (i) (i=0, 1, 2, 3, 4, or 5), the dimensions of elements with i=0, 2, and 4 are selected from the blocks b1=even numbered blocks, and the dimensions of elements with i=1, 3, and 5 are selected from the blocks b1=odd numbered blocks.

Thus, when generating gradient orientation histograms of 96 dimensions at the layer 2 as a result of expansion, the feature vector expanding unit 26 may generate gradient orientation histograms at the layer 2 using only the unselected dimensions of elements with i=1, 3, and 5 for the block b1=even numbered blocks at the layer 1 and using only the unselected dimensions of elements with i=0, 2, and 4 for the block b1=odd numbered blocks at the layer 1.

For example, in the above example, when a gradient orientation histogram of the block b2=0 is generated from gradient orientation histograms of the blocks b1=0, 1, 5, and 6 at the layer 1, the feature vector expanding unit 26 may use only the unselected dimensions of elements with i=1, 3, and 5 for the blocks b1=0 and 6 and may use only unselected dimensions of elements with i=0, 2, and 4 for the blocks b1=1 and 5.

The dimension selecting unit 18 may select, from the thus generated gradient orientation histograms of 96 dimensions, a half number of dimensions, that is, 48 dimensions, in accordance with a pattern similar to the pattern at the layer 1 (the blocks from which the elements with i=0, 2, and 4 are to be selected are arranged alternately with the blocks from which the elements with i=1, 3, and 5 are to be selected) (75+48=123 dimensions in total).

When expanding from the layer 2 to the layer 3, the feature vector expanding unit 26 may similarly use 48 unselected dimensions at the layer 2 to generate gradient orientation histograms of 54 dimensions at the layer 3. Then, the dimension selecting unit 18 may select, from the generated gradient orientation histograms of 54 dimensions at the layer 3, a half number of dimensions, that is, 27 dimensions, in a similar pattern (the blocks from which the elements with i=0, 2, and 4 are to be selected are arranged alternately with the blocks from which the elements with i=1, 3, and 5 are to be selected) (75+48+27=150 dimensions in total).

Thus, the gradient orientation histograms resulting from expansion are new information not contained in the feature vectors output by the dimension selecting unit 18. As a result, the accuracy of identification can be improved.

As shown in the right of FIG. 18, the dimension selecting unit 18 may output a local feature descriptor by selecting dimensions so that, for gradient orientation histograms generated at each scale, dimensions selected from adjacent subregions are not in the same gradient orientation.

Now, an example of priorities for dimension selection is illustrated in which dimensions are selected from gradient orientation histograms of 96 dimensions (4×4=16 blocks) generated at the layer 2. For dimensions selected from the layer 2, the dimension selecting unit 18 may select the dimensions by sequentially adding dimensions, for example, in such order of blocks as shown in FIG. 21, between the 1st dimension and the 16th dimension, between the 17th dimension and the 32th dimension, and between the 33rd dimension and the 48 dimension.

The use of the priorities shown in FIG. 21 allows the dimension selecting unit 18 to select gradient orientations with higher priorities placed on blocks closer to the center. Furthermore, when the block number is denoted by b2, the quantized orientations in gradient orientation histograms are denoted by (i) (i=0, 1, 2, 3, 4, or 5), and the number k (k=0, 1, . . . , or 95) of each of the elements of feature vectors in gradient orientation histograms of 96 dimensions is k=6×b+i, the dimensions (elements) may be selected in order, for example, in accordance with priorities shown in FIG. 22.

Figures 23, 24:
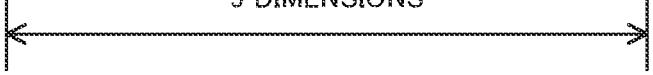
FIG. 23 is a diagram showing another example of priorities for selection of dimensions.
FIG. 24 is a diagram showing a configuration example of a local feature descriptor output in accordance with the priorities.

Now, an example of priorities for dimension selection is illustrated in which dimensions are selected from gradient orientation histograms of 54 dimensions (3×3=9 blocks) generated at the layer 3. For dimensions selected from the layer 3, the dimension selecting unit 18 may select the dimensions by sequentially adding dimensions, for example, in such order of blocks as shown in FIG. 23, between the 1st dimension and the 9th dimension, between the 10th dimension and the 18th dimension, and between the 19th dimension and the 27th dimension. The use of the priorities shown in FIG. 23 allows the dimension selecting unit 18 to select gradient orientations with higher priorities placed on blocks closer to the center. Furthermore, when the block number is denoted by b3, the quantized orientations in gradient orientation histograms are denoted by (i) (i=0, 1, 2, 3, 4, or 5), and the number k (k=0, 1, . . . , or 53) of each of the elements of feature vectors in gradient orientation histograms of 54 dimensions is k=6×b+i, the dimension selecting unit 18 may select the dimensions (elements) in order, for example, in accordance with priorities shown in FIG. 24.

In a specific example, the dimension selecting unit 18 may configure the 76th dimension to the 123rd dimension (75 dimensions+48 dimensions=128 dimensions) by selecting the 1st dimension to the 75th dimension (half of 150 dimensions) in order in accordance with the priorities at the layer 1 shown in FIG. 7 and then selecting the 1st dimension to the 48th dimension (half of 96 dimensions) in order in accordance with the priorities at the layer 2 shown in FIG. 22. Moreover, the dimension selecting unit 18 may then configure the 124th dimension to the 150th dimension (75 dimensions+48 dimensions+27 dimensions=150 dimensions) by selecting the 1st dimension to the 27th dimension (half of 54 dimensions) in order in accordance with the priorities at the layer 3 shown in FIG. 24.

The pattern of expansion carried out by the feature vector expanding unit 26 is not limited to the above-described examples. For example, the feature vector expanding unit 26 may generate expanded feature vectors by quantizing a gradient orientation histogram for each subregion (block). Specifically, expanded feature vectors may be generated, by, for example, multiplying the sum of gradient orientation histograms for the entire local region by a coefficient $\alpha$ to obtain a threshold and setting 0 when the sum of the gradient orientation histograms for the subregions is equal to or smaller than the threshold, while setting 1 when the sum of the gradient orientation histograms for the subregions is equal to or larger than the threshold. Alternatively, the feature vector expanding unit 26 can expand feature vectors, for example, based on differences instead of the sum of the gradient orientation histograms. Specifically, the feature vector expanding unit 26 may expand the feature vectors based on a difference in the value of the same dimension between different subregions in the gradient orientation histograms.

The feature vectors (gradient orientation histograms) may be quantized using a combination of the third embodiment and the fourth embodiment. The quantization may be carried out using different parameters for the respective layers (layer 1, layer 2, and layer 3). For example, the quantization may be carried out based on Formula (1), and when the threshold th is calculated in accordance with Formula 2, the value of the coefficient $\alpha$ may vary among the layers. For example, $\alpha=0.063$ for the layer 1, $\alpha=0.10$ for the layer 2, and $\alpha=0.12$ for the layer 3.

As described above, in the local feature descriptor extracting apparatus 1E according to the fifth embodiment, the feature vector expanding unit 26 may expand feature vectors. Thus, feature vectors containing new information not present in the original feature vectors are generated, allowing the accuracy of identification to be improved.

Sixth Embodiment

Figure 25:
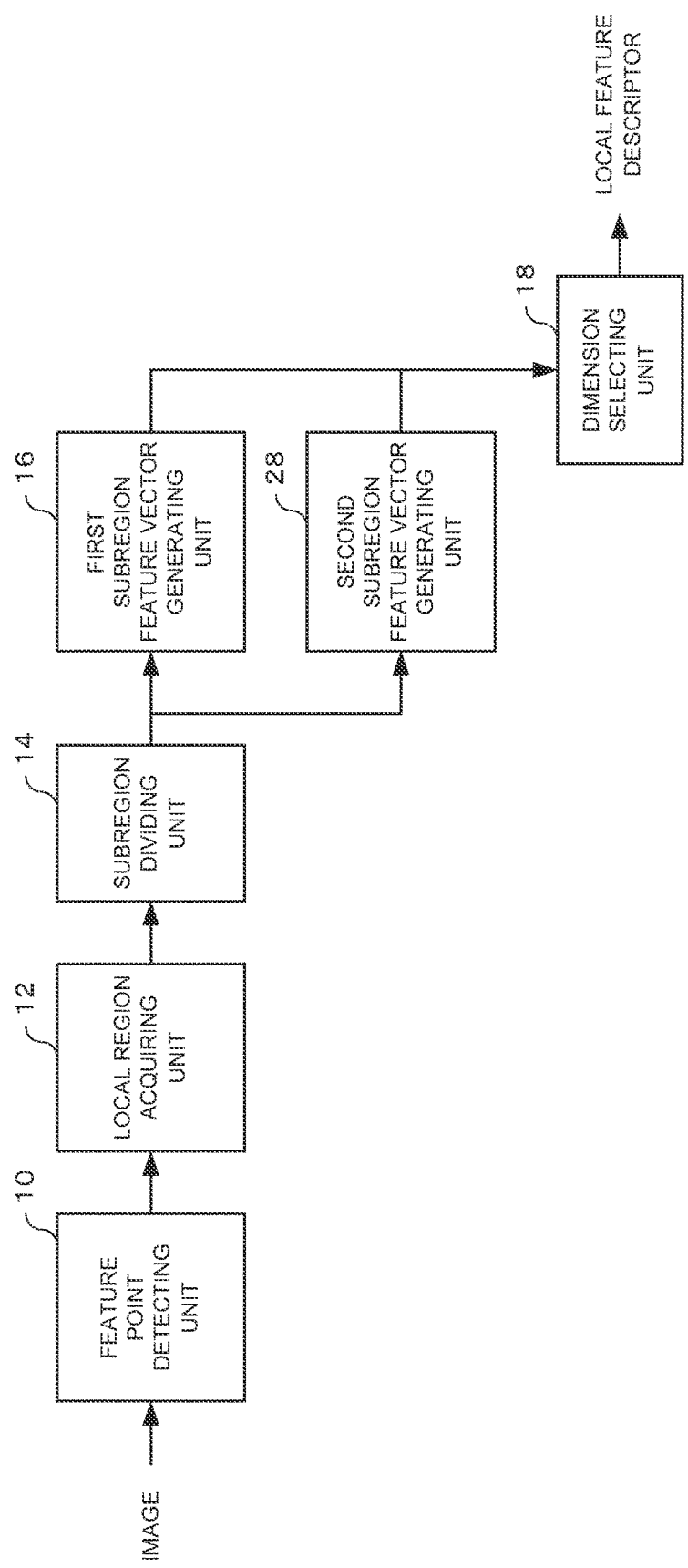
FIG. 25 is a diagram showing a configuration of a local feature descriptor extracting apparatus according to a sixth embodiment of the present invention.

Now, a sixth embodiment will be described. FIG. 25 is a diagram showing a configuration of a local feature descriptor extracting apparatus according to the sixth embodiment of the present invention. As shown in FIG. 25, a local feature descriptor extracting apparatus 1F is configured to include a feature point detecting unit 10, a local region acquiring unit 12, a subregion dividing unit 14, a first subregion feature vector generating unit 16, a second subregion feature vector generating unit 28, and a dimension selecting unit 18. Thus, the configuration of the local feature descriptor extracting apparatus 1F corresponds to the local feature descriptor extracting apparatus 1A according to the first embodiment to which the second subregion feature vector generating unit 28 is added. The same components of the sixth embodiment as the corresponding components of the first embodiment are denoted by the same reference numerals and will not be described below. Furthermore, the second subregion feature vector generating unit 28 is applicable not only to the local feature descriptor extracting apparatus according to the first embodiment but also to the local feature descriptor extracting apparatuses according to the other embodiments.

The second subregion feature vector generating unit 28 may generate gradient orientation histograms of gradient orientations different from the gradient orientations provided by the first subregion feature vector generating unit 16. For example, when the first subregion feature vector generating unit 16 generates gradient orientation histograms of eight orientations at intervals of 45°, the second subregion feature vector generating unit 28 may generate gradient orientation histograms of six orientations at intervals of 60°.

Then, the dimension selecting unit 18 may output a local feature descriptor by selecting dimensions so that, for feature vectors generated by the first subregion feature vector generating unit 16 and feature vectors generated by the second subregion feature vector generating unit 28, dimensions selected from adjacent subregions are not in the same gradient orientation.

As described above, in the local feature descriptor extracting apparatus 1F according to the sixth embodiment, the second subregion feature vector generating unit 28 generates gradient orientation histograms of gradient orientations different from the gradient orientations provided by the first subregion feature vector generating unit 16. This increases the amount of information on the feature vectors, enabling the accuracy of identification to be improved.

In the sixth embodiment, the two subregion feature vector generating units, the first subregion feature vector generating unit 16 and the second subregion feature vector generating unit 28, are illustrated. However, three or more feature vector generating units may be provided.

Seventh Embodiment

Figure 26:
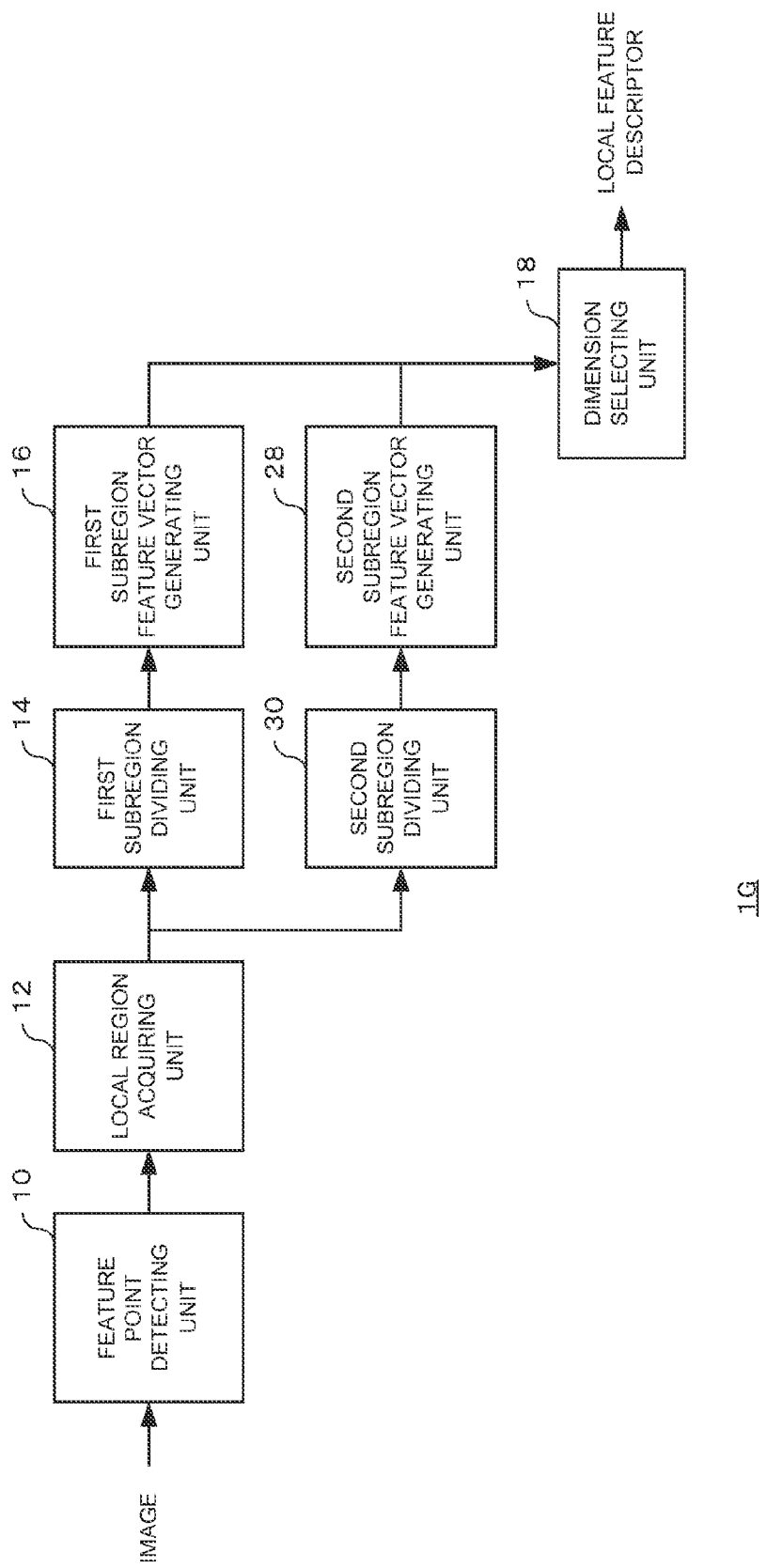
FIG. 26 is a diagram showing a configuration of a local feature descriptor extracting apparatus according to a seventh embodiment of the present invention.

Now, a seventh embodiment will be described. FIG. 26 is a diagram showing a configuration of a local feature descriptor extracting apparatus according to the seventh embodiment of the present invention. As shown in FIG. 26, a local feature descriptor extracting apparatus 1G is configured to include a feature point detecting unit 10, a local region acquiring unit 12, a first subregion dividing unit 14, a second subregion dividing unit 30, a first subregion feature vector generating unit 16, a second subregion feature vector generating unit 28, and a dimension selecting unit 18. Thus, the configuration of the local feature descriptor extracting apparatus 1G corresponds to the local feature descriptor extracting apparatus 1F according to the sixth embodiment to which the second subregion dividing unit 30 is added. The same components of the seventh embodiment as the corresponding components of the sixth embodiment are denoted by the same reference numerals and will not be described below.

The second subregion dividing unit 30 carry out area division using a technique different from the technique used by the first subregion dividing unit 14. For example, when the first subregion dividing unit 14 divides a local region into 4×4 blocks, the second subregion dividing unit 30 may divide the local region into 5×5 blocks.

Then, the first subregion feature vector generating unit 16 generates a gradient orientation histogram for each of the subregions resulting from the division carried out by the first subregion dividing unit 14. Furthermore, the second subregion feature vector generating unit 28 generates a gradient orientation histogram for each of the subregions resulting from the division carried out by the second subregion dividing unit 30.

As described above, in the local feature descriptor extracting apparatus 1G according to the seventh embodiment, the second subregion dividing unit 30 divides a local region using the technique different from the technique used by the first subregion dividing unit 14. This increases the amount of information on the feature vectors, enabling the accuracy of identification to be improved.

In the seventh embodiment, the two subregion dividing units, the first subregion dividing unit 14 and the second subregion dividing unit 30, are illustrated. However, three or more subregion dividing units may be provided.

Eighth Embodiment

Figure 27:
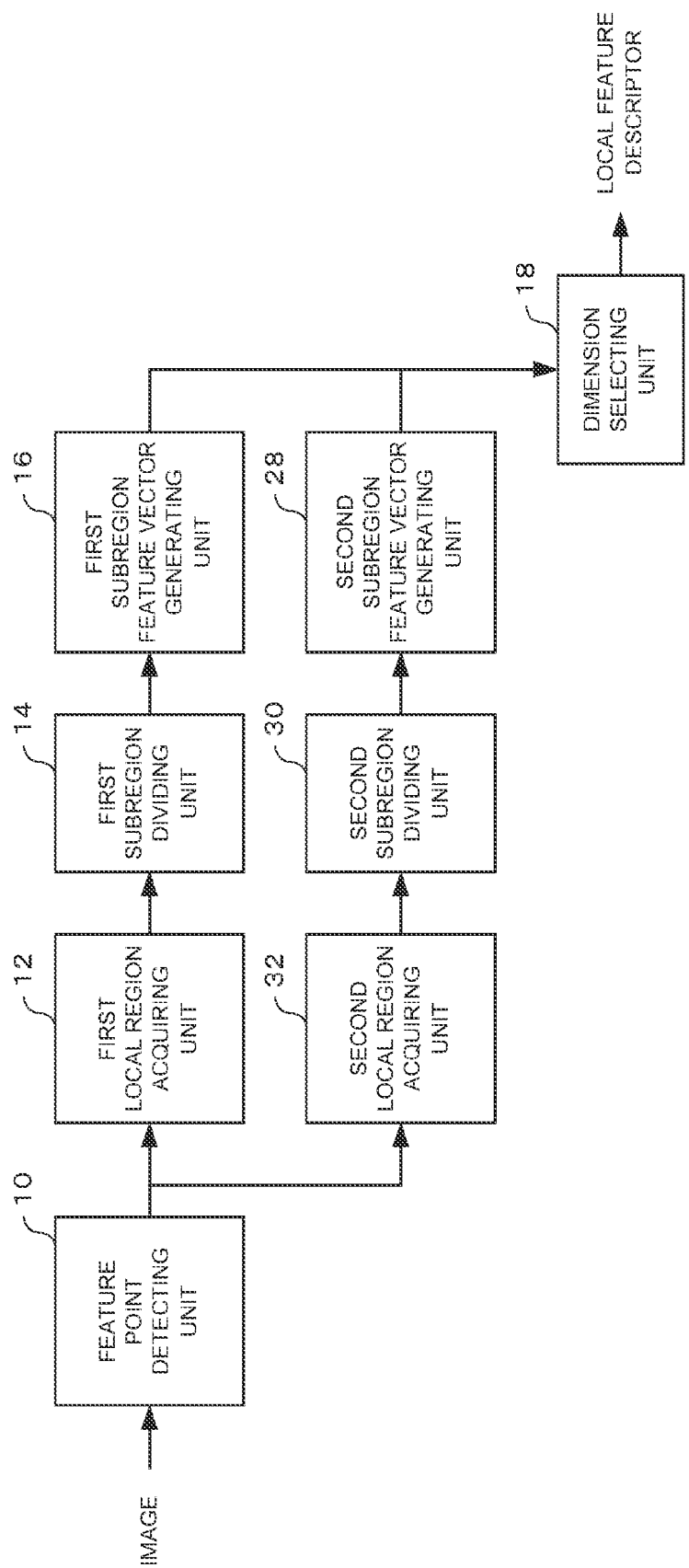
FIG. 27 is a diagram showing a configuration of a local feature descriptor extracting apparatus according to an eighth embodiment of the present invention.

Now, an eighth embodiment will be described. FIG. 27 is a diagram showing a configuration of a local feature descriptor extracting apparatus according to the eighth embodiment of the present invention. As shown in FIG. 27, a local feature descriptor extracting apparatus 1H is configured to include a feature point detecting unit 10, a first local region acquiring unit 12, a second local region acquiring unit 32, a first subregion dividing unit 14, a second subregion dividing unit 30, a first subregion feature vector generating unit 16, a second subregion feature vector generating unit 28, and a dimension selecting unit 18. Thus, the configuration of the local feature descriptor extracting apparatus 1H corresponds to the local feature descriptor extracting apparatus 1G according to the seventh embodiment to which the second local region acquiring unit 32 is added. The same components of the eighth embodiment as the corresponding components of the seventh embodiment are denoted by the same reference numerals and will not be described below.

The second local region acquiring unit 32 acquires a local region using a technique different from the technique used by the first local region acquiring unit 12. For example, when the first local region acquiring unit 12 acquires a square local region, the second local region acquiring unit 32 may acquire a circular local region.

The first subregion dividing unit 14 divides a local region acquired by the first local region acquiring unit 12 into subregions. Furthermore, the second subregion dividing unit 30 divides a local region acquired by the second local region acquiring unit 32 into subregions.

As described above, in the local feature descriptor extracting apparatus 1H according to the eighth embodiment, the second local region acquiring unit 32 acquires a local region using the technique different from the technique used by the first local region acquiring unit 12. This increases the amount of information on the feature vectors, enabling the accuracy of identification to be improved.

In the eighth embodiment, the two local region acquiring unit, the first local region acquiring unit 12 and the second local region acquiring unit 32, are illustrated. However, three or more local region acquiring units may be provided.

Ninth Embodiment

Figure 28:
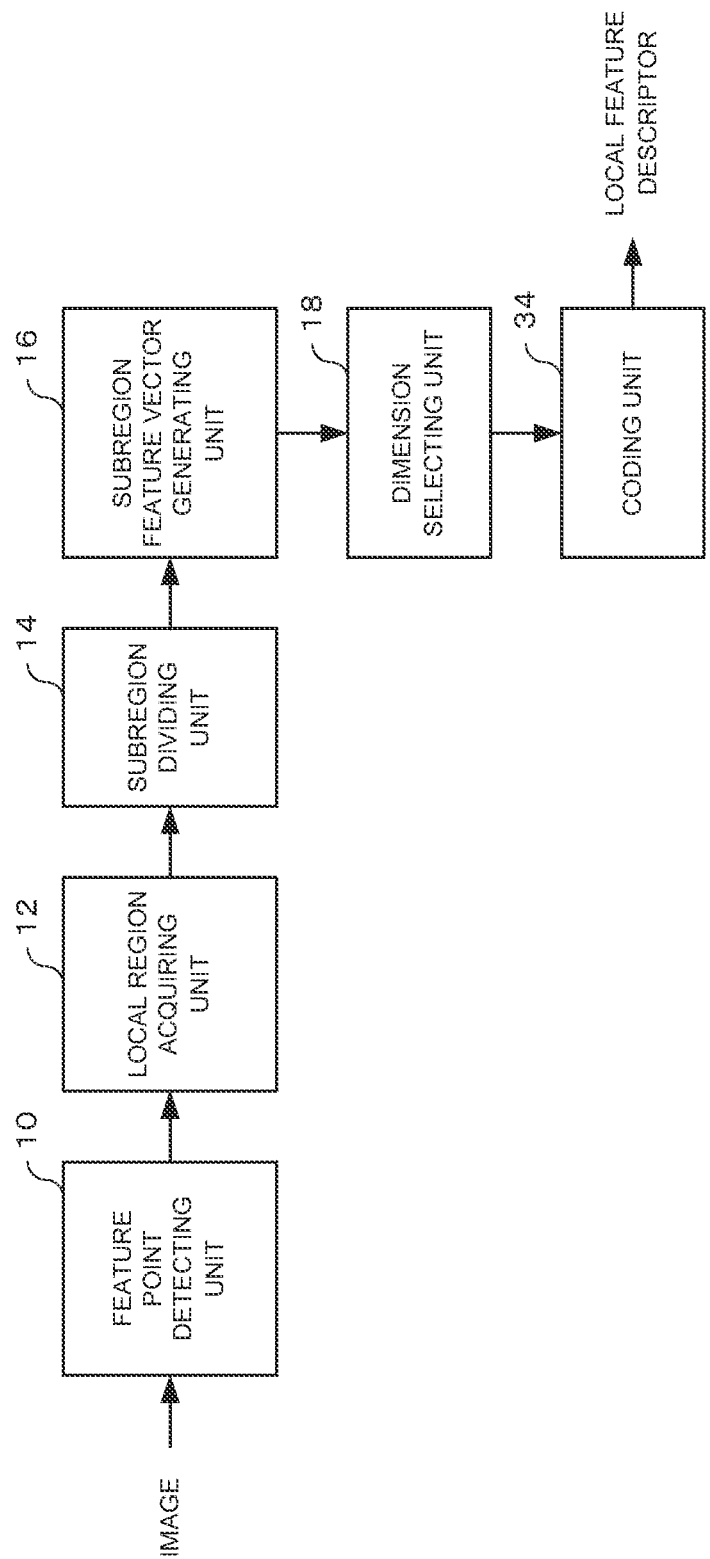
FIG. 28 is a diagram showing a configuration of a local feature descriptor extracting apparatus according to a ninth embodiment of the present invention.

Now, a ninth embodiment will be described. FIG. 28 is a diagram showing a configuration of a local feature descriptor extracting apparatus according to the ninth embodiment of the present invention. As shown in FIG. 28, a local feature descriptor extracting apparatus 1J is configured to include a feature point detecting unit 10, a local region acquiring unit 12, a subregion dividing unit 14, a subregion feature vector generating unit 16, a dimension selecting unit 18, and a coding unit 34. Thus, the configuration of the local feature descriptor extracting apparatus 1J corresponds to the local feature descriptor extracting apparatus 1A according to the first embodiment to which the coding unit 34 is added. The same components of the ninth embodiment as the corresponding components of the first embodiment are denoted by the same reference numerals and will not be described below. Furthermore, the coding unit 34 is applicable not only to the local feature descriptor extracting apparatus according to the first embodiment but also to the local feature descriptor extracting apparatuses according to the other embodiments.

The coding unit 34 may code feature vectors output by the dimension selecting unit 18 and having dimensions arranged in order of priority and output the coded vectors as a bit stream of feature descriptors. The coding unit 34 may code, for example, feature vectors using a fixed bit length. Furthermore, for example, the coding unit 34 may carry out coding based on lossless coding (reversible compression) such as entropy coding using a Huffman code or an arithmetic code or on lossy coding (irreversible compression).

Specifically, for example, if feature vectors are binary feature descriptors resulting from quantization into a binary of 0 or 1 carried out by the quantizing unit 22 illustrated in the third embodiment, the coding unit 34 may carry out coding by associating N dimensions with N bits (N/8 bytes) and using a fixed bit length. For example, the coding unit 34 may code feature vectors of 96 dimensions (96 bits) into 96/8=12 bytes. Furthermore, for example, the coding unit 34 may carry out entropy coding using the Huffman code or the arithmetic code. Additionally, for example, when using entropy coding such as the arithmetic code, the coding unit 34 may use information on coded dimensions to carry out efficient coding (context coding).

Furthermore, the coding unit 34 can carry out coding using information on a group of feature vectors extracted from an image. For example, the image contains many repeatedly appearing patterns, and thus, the coding unit 34 may carry out coding by grouping such similar feature vectors. Furthermore, if the image is a frame of a moving image, the coding unit 34 tracks feature points between successive frames and associate the current feature points with the feature points in the past frames, and code only the values of differences between the feature vectors. Thus, the coding unit 34 carries out coding using information on a group of feature vectors, enabling coding compression at a scale much larger than the individual compression of feature vectors.

Furthermore, the coding unit 34 may code a group of feature vectors extracted from an image in any order. For example, the coding unit 34 may code feature vectors (feature points) in the order in which the feature vectors have been extracted. Additionally, in addition to the feature vectors of the feature points, information on the coordinate positions (X coordinate value, Y coordinate value) of the feature points may be to be coded. In this case, it is possible that the coding unit 34 rearranges the feature points in a certain predetermined order such as the raster scan order and codes only the values of differences between coordinate values. In this case, the coding unit 34 may code the feature vectors in this order. Thus, information on the coordinate values of the feature points may be coded using a shorter bit length than in a case where the coordinate values are coded using a fixed bit length.

Furthermore, in addition to the feature vectors of the feature points, scale information on the feature points output by the feature point detecting unit 10 may be to be coded. In this case, it is possible that the coding unit 34 rearranges the feature vectors in scale value order for coding and codes only numbers at which the scale value changes and the corresponding scale values. This eliminates the need to code all of the scale values for the individual feature vectors. Additionally, when both the scale information and the coordinate values are coded, the coding unit 34 may rearrange the feature vectors in scale value order and code feature points with the same scale value in raster scan order. In addition, the coding unit 34 may code orientation information as is the case with the scale information.

Furthermore, the coding unit 34 may code a group of feature vectors in order of decreasing importance. The reference for the importance of feature points is, for example, similar to the reference in the first embodiment. Thus, an apparatus for matching of feature descriptors may carry out efficient matching; the apparatus performs matching of the feature descriptors in order starting with the leading feature point (the most important feature point), and discontinues the matching upon successfully determining whether or not a match is found.

Furthermore, when the number of dimensions selected from the feature vectors is the same for the entire image, the coding unit 34 may enter (code) the number of dimensions at the leading position of the bit stream. When the number of dimensions varies among the feature points, the coding unit 34 needs to code the corresponding information so that the coded information clearly indicates the number of dimensions for the individual feature points. In this case, the coding unit 34 may code the information on the number of dimensions for each feature point. Additionally, as is the case with the coding of the scale information, it is possible that the coding unit 34 rearranges the feature vectors in number-of-dimensions order for coding and codes only the numbers at which the number of dimensions changes and the corresponding numbers of dimensions. This eliminates the need to code all of the values of the numbers of dimensions for the individual feature vectors.

As described above, in the local feature descriptor extracting apparatus 1J according to the ninth embodiment, the coding unit 34 codes local feature descriptors, thus enabling a further reduction in the size of the local feature descriptor.

Applied Examples

Figure 29:
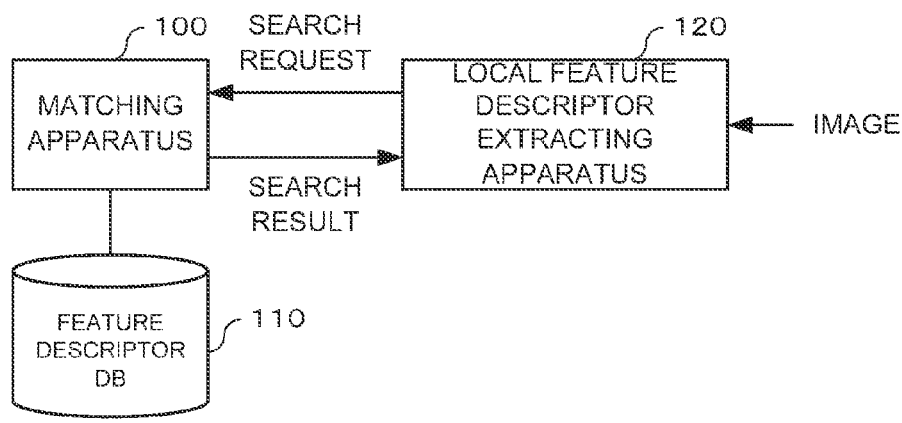
FIG. 29 is a diagram showing an example of a matching system to which the local feature descriptor extracting apparatus is applicable.

FIG. 29 is a diagram showing an example of a matching system to which the local feature descriptor extracting apparatuses illustrated in the first to ninth embodiments are applicable. As shown in FIG. 29, the matching system is configured to include a matching apparatus 100, a feature descriptor database (DB) 110, and a local feature descriptor extracting apparatus 120.

The matching apparatus 100 may search for an image containing an object similar to an object in an image input to the local feature descriptor extracting apparatus 120 by matching a local feature descriptor contained in a search request transmitted by the local feature descriptor extracting apparatus 120, against a local feature descriptor stored in the feature descriptor DB 110.

The feature descriptor DB 110 stores local feature descriptors extracted from a plurality of images in association with the images from which the local feature descriptors have been extracted. The local feature descriptors stored in the feature descriptor DB 110 may be, for example, feature vectors of 150 dimensions output in the order shown in FIG. 7.

The local feature descriptor extracting apparatus 120 may be the local feature descriptor extracting apparatus illustrated in any of the first to ninth embodiments.

The local feature descriptor extracting apparatus 120 generates a search request containing the local feature descriptors of feature points detected in an input image, and transmits the search request to the matching apparatus 100. The matching apparatus 100 matches the received local feature descriptors against the local feature descriptors stored in the feature descriptor DB 110 to determine an image similar to the input image. The matching apparatus 100 then outputs information indicative of the image determined to be similar to the input image to the local feature descriptor extracting apparatus 120 as a search result.

In such a matching system, the local feature descriptor extracting apparatus 120 selects dimensions (elements) to be output as a local feature descriptor so as to reduce the correlation between proximate subregions based on the positional relations among the subregions, as described in the first to ninth embodiments. Thus, the matching system can reduce the size of the local feature descriptor while maintaining the accuracy of matching carried out by the matching apparatus 100.

This enables a reduction in communication time needed to transmit local feature descriptors from the local feature descriptor extracting apparatus 120 to the matching apparatus 100. Furthermore, the reduced size of the local feature descriptor enables a reduction in the processing load of matching carried out by the matching apparatus 100. Moreover, the local feature descriptor has a layered (progressive) structure as shown in FIG. 7. Hence, even when the number of dimensions in the local feature descriptor extracted by the local feature descriptor extracting apparatus 120 is different from the number of dimensions in the local feature descriptor stored in the feature descriptor DB 110, the matching apparatus 100 can carry out a matching process using the local feature descriptor of up to the number of dimensions which is common to the feature descriptor DB 110 and the local feature descriptor extracting apparatus 120.

Figure 30:
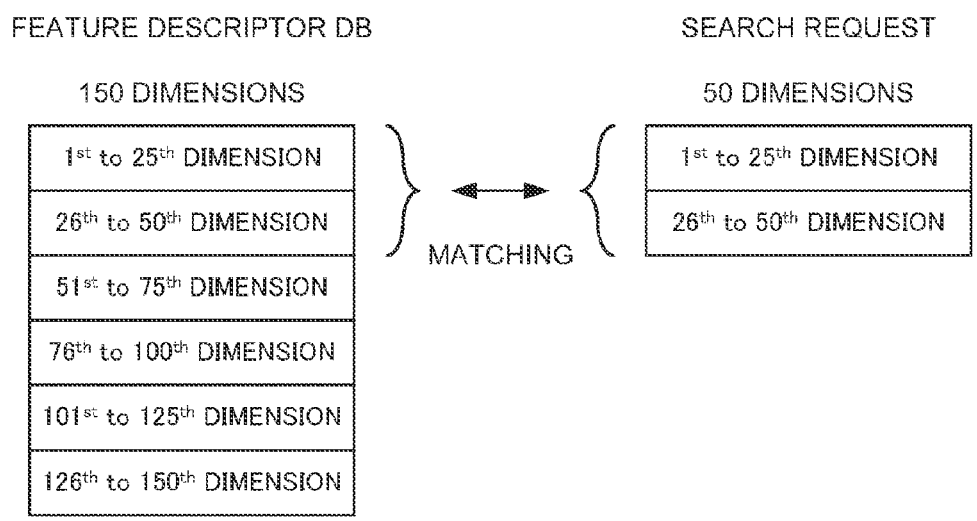
FIG. 30 is a diagram showing an example of matching using local feature descriptors in a matching apparatus.
Figure 31:
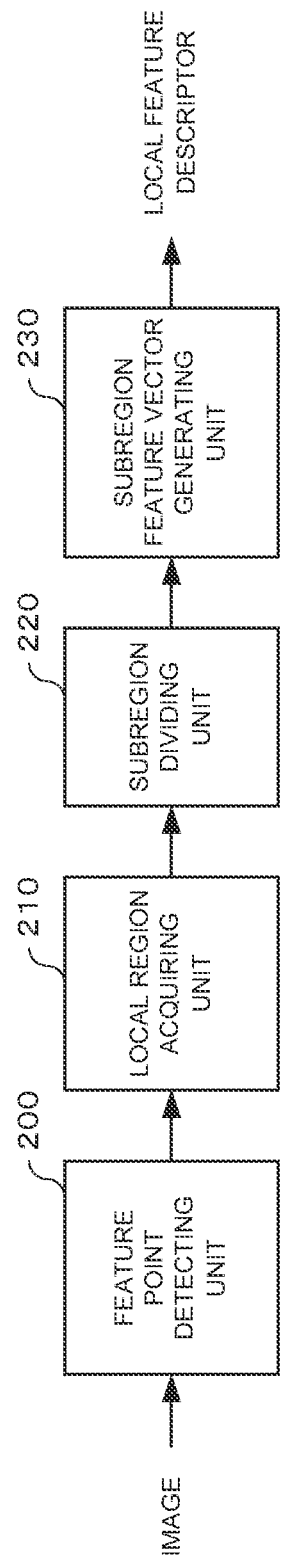
FIG. 31 is a diagram showing an example of a general configuration of a local feature descriptor extracting apparatus that uses SIFT feature descriptors.

For example, it is assumed that the local feature descriptor stored in the feature descriptor DB 110 is equivalent to 150 dimensions, whereas the local feature descriptor extracted by the local feature descriptor extracting apparatus 120 is equivalent to 50 dimensions as shown in FIG. 30. In this case, the matching apparatus 100 can carry out matching using the local feature descriptor of up to 50 dimensions in both the feature descriptor DB 110 and the local feature descriptor extracting apparatus 120. In other words, even when, for example, the number of dimensions in the local feature descriptor is changed according to the processing capability of the local feature descriptor extracting apparatus 120, the matching apparatus 100 can carry out a matching process using the local feature descriptor of a changed number of dimensions.

The embodiments are intended to facilitate understanding of the present invention and not intended to limit interpretation of the present invention. The present invention may be changed or improved without departing from the spirits thereof and includes equivalents thereof.

The application claims priority based on Japanese Patent Application No. 2011-253257 filed on Nov. 18, 2011, the disclosure of which is entirely incorporated herein.

The present invention has been described with reference to the embodiments. However, the present invention is not limited to the above-described embodiments. Various changes understandable by those skilled in the art may be made to the configuration and details of the present invention within the scope thereof.

Some or all of the embodiments may be described as follows, but the present invention is not limited to these features.

(Feature 1) A local feature descriptor extracting apparatus comprising: a feature point detecting unit configured to detect feature points in an image; a first local region acquiring unit configured to acquire a local region for each of the feature points; a first subregion dividing unit configured to divide each local region into a plurality of subregions; a first subregion feature vector generating unit configured to generate a feature vector with a plurality of dimensions for each of the subregions in each local region; and a dimension selecting unit configured to select dimensions from the feature vector in each subregion so as to reduce a correlation between proximate subregions based on positional relations among the subregions in each local region and output elements of the selected dimensions as a feature descriptor of the local region.

(Feature 2) The local feature descriptor extracting apparatus according to Feature 1, wherein the dimension selecting unit is configured to select the dimensions from the feature vector in such a manner that the adjacent subregions are different from each other in at least one of the selected dimensions.

(Feature 3) The local feature descriptor extracting apparatus according to Feature 1 or 2, wherein the dimension selecting unit is configured to select the dimensions from the feature vector in accordance with a selection order for selecting the dimensions from the feature vectors in the plurality of subregions in the local region.

(Feature 4) The local feature descriptor extracting apparatus according to Feature 3, wherein the dimension selecting unit is configured to output elements of the selected dimensions in order of the dimensions selected in accordance with the selection order, as the feature descriptor of the local region.

(Feature 5) The local feature descriptor extracting apparatus according to any one of Features 1 to 4, further comprising a number-of-dimensions determining unit configured to determine the number of dimensions selected by the dimension selecting unit, wherein the dimension selecting unit is configured to select the dimensions from the feature vector in such a manner that the number of dimensions for the feature descriptor of the local region is equal to the determined number of dimensions.

(Feature 6) The local feature descriptor extracting apparatus according to Feature 5, wherein the number-of-dimensions determining unit is configured to determine the number of dimensions selected for the feature descriptor of the local region for each feature point, according to the number of the detected feature points.

(Feature 7) The local feature descriptor extracting apparatus according to Feature 5, wherein the number-of-dimensions determining unit is configured to determine the number of dimensions selected for the feature descriptor of the local region for each feature point, based on information indicative of importance of each feature point.

(Feature 8) The local feature descriptor extracting apparatus according to any one of Features 1 to 7, further comprising a quantizing unit configured to quantize the feature vector in each subregion, wherein the dimension selecting unit is configured to select the dimensions from the quantized feature vector.

(Feature 9) The local feature descriptor extracting apparatus according to any one of Features 1 to 7, further comprising a quantizing unit configured to quantize the feature descriptor of the local region.

(Feature 10) The local feature descriptor extracting apparatus according to any one of Features 1 to 9, further comprising a feature vector expanding unit configured to generate, based on the feature vectors in a plurality of proximate subregions, a feature vector for an expanded subregion that is a subregion larger than each of the plurality of proximate subregions, wherein the dimension selecting unit is configured to select dimensions from the feature vector in each expanded subregion so as to reduce a correlation between the proximate expanded subregions based on positional relations among the expanded subregions in each local region and output elements of the selected dimensions as a feature descriptor of the local region.

(Feature 11) The local feature descriptor extracting apparatus according to Feature 10, wherein the elements of the feature vector are a feature descriptor depending on an orientation, and the feature vector expanding unit is conjured to generate a feature vector for the expanded subregion based on elements of dimensions, of the feature vector in each subregion, which are not selected by the dimension selecting unit.

(Feature 12) The local feature descriptor extracting apparatus according to any one of Features 1 to 11, further comprising a second subregion feature vector generating unit configured to generate, for each of the subregions in each local region, a feature vector with a plurality of dimensions which is different, in orientation of at least one element, from the feature vector generated by the first subregion feature vector generating unit.

(Feature 13) The local feature descriptor extracting apparatus according to Feature 12, further comprising a second subregion dividing unit configured to divide each local region into a plurality of subregions different from the plurality of subregions obtained by division by the first subregion dividing unit, wherein the second subregion feature vector generating unit is configured to generate the feature vector for each of the subregions obtained by division by the second subregion dividing unit.

(Feature 14) The local feature descriptor extracting apparatus according to Feature 13, further comprising a second local region acquiring unit configured to acquire, for each feature point, a local region different from the local region acquired by the first local region acquiring unit, wherein the second subregion dividing unit is configured to divide each of the local regions acquired by the second local region acquiring unit into a plurality of subregions.

(Feature 15) A method for extracting a local feature descriptor, the method performed by a computer comprising: detecting feature points in an image; acquiring a local region for each of the feature points; dividing each local region into a plurality of subregions; generating a feature vector with a plurality of dimensions for each of the subregions in each local region; and selecting dimensions from the feature vector in each subregion so as to reduce a correlation between proximate subregions based on positional relations among the subregions in each local region and outputting elements of the selected dimensions as a feature descriptor of the local region.

(Feature 16) A program causing a computer to implement: a function of detecting feature points in an image; a function of acquiring a local region for each of the feature points; a function of dividing each local region into a plurality of subregions; a function of generating a feature vector with a plurality of dimensions for each of the subregions in each local region; and a function of selecting dimensions from the feature vector in each subregion so as to reduce a correlation between proximate subregions based on positional relations among the subregions in each local region and outputting elements of the selected dimensions as a feature descriptor of the local region.

(Feature 17) The local feature descriptor extracting apparatus according to any one of Features 1 to 14, further comprising a coding unit configured to code the feature descriptor of the local region.

1A to 1J Local feature descriptor extracting apparatus
10 Feature point extracting unit
12 Local region acquiring unit
14 Subregion dividing unit
16 Subregion feature vector generating unit
18 Dimension selecting unit
20 Number-of-dimensions determining unit
22, 24 Quantizing unit
26 Feature vector expanding unit
34 Coding unit

We claim:

1. A local feature descriptor extracting apparatus comprising:
    memory that stores an image;
    a processor configured to:
        detect feature points in the image;
        acquire a first local region for each of the feature points;
        divide each first local region into a first plurality of subregions;
        generate a first feature vector with a plurality of dimensions for each of the subregions in each first local region;
        select dimensions from the first feature vector in each subregion such that at least one gradient orientation differs between proximate subregions and output elements of the selected dimensions as a feature descriptor of the first local region; and
        store, in association with the image, the feature descriptor of each first local region of the image in the memory.

2. The local feature descriptor extracting apparatus according to claim 1, wherein the processor is configured to select the dimensions from the first feature vector in such a manner that the adjacent subregions are different from each other in at least one of the selected dimensions.

3. The local feature descriptor extracting apparatus according to claim 1, wherein the processor is configured to select the dimensions from the first feature vector in accordance with a selection order for selecting the dimensions from the first feature vectors in the first plurality of subregions in the first local region.

4. The local feature descriptor extracting apparatus according to claim 3, wherein the processor is configured to output elements of the selected dimensions in order of the dimensions selected in accordance with the selection order, as the feature descriptor of the first local region.

5. The local feature descriptor extracting apparatus according to claim 1, wherein the processor is configured to determine the number of dimensions selected and to select the dimensions from the first feature vector in such a manner that the number of dimensions for the feature descriptor of the first local region is equal to the determined number of dimensions.

6. The local feature descriptor extracting apparatus according to claim 5, wherein the processor is configured to determine the number of dimensions selected for the feature descriptor of the first local region for each feature point, according to the number of the detected feature points.

7. The local feature descriptor extracting apparatus according to claim 5, wherein the processor is configured to determine the number of dimensions selected for the feature descriptor of the first local region for each feature point, based on information indicative of importance of each feature point.

8. The local feature descriptor extracting apparatus according to claim 1, wherein the processor is configured to quantize the first feature vector in each subregion, and
    to select the dimensions from the quantized first feature vector.

9. The local feature descriptor extracting apparatus according to claim 1, wherein the processor is configured to quantize the feature descriptor of the first local region.

10. The local feature descriptor extracting apparatus according to claim 1, wherein the processor is configured to generate, based on the first feature vectors in a plurality of proximate subregions, a feature vector for an expanded subregion that is a subregion larger than each of the plurality of proximate subregions, and
    to select dimensions from the feature vector in each expanded subregion to reduce a correlation between the proximate expanded subregions based on positional relations among the expanded subregions in each first local region and output elements of the selected dimensions as a feature descriptor of the first local region.

11. The local feature descriptor extracting apparatus according to claim 10, wherein the elements of the first feature vector are a feature descriptor depending on an orientation, and
    the processor is configured to generate a feature vector for the expanded subregion based on elements of dimensions, of the first feature vector in each subregion, which are not selected.

12. The local feature descriptor extracting apparatus according to claim 1, wherein the processor is configured to generate, for each of the subregions in each first local region, a second feature vector with a plurality of dimensions which is different, in orientation of at least one element, from the first feature vector.

13. The local feature descriptor extracting apparatus according to claim 12, wherein the processor is configured to divide each first local region into a second plurality of subregions different from the first plurality of subregions, and to generate the feature vector for each of the subregions of the second plurality of subregions.

14. The local feature descriptor extracting apparatus according to claim 13, wherein the processor is configured to acquire, for each feature point, a second local region different from the first local region acquired by the processor, and to divide each of the second local regions into a plurality of subregions.

15. A method for extracting a local feature descriptor, the method performed by a processor in communication with memory comprising:
    retrieving an image from the memory;
    detecting feature points in an image;
    acquiring a local region for each of the feature points;
    dividing each local region into a plurality of subregions;
    generating a feature vector with a plurality of dimensions for each of the subregions in each local region;
    selecting dimensions from the feature vector in each subregion such that at least one gradient orientation differs between proximate subregions and outputting elements of the selected dimensions as a feature descriptor of the local region; and
    storing, in association with the image, the feature descriptor of each local region of the image in the memory.

16. A non-transitory computer-readable storage medium storing a program for causing a computer to implement:
    a function of retrieving an image from memory;
    a function of detecting feature points in the image;

a function of acquiring a local region for each of the feature points;

a function of dividing each local region into a plurality of subregions;

a function of generating a feature vector with a plurality of dimensions for each of the subregions in each local region;

a function of selecting dimensions from the feature vector in each subregion such that at least one gradient orientation differs between proximate subregions and outputting elements of the selected dimensions as a feature descriptor of the local region; and a function of storing, in association with the image, the feature descriptor of each local region of the image in the memory.

* * * * *